(12) United States Patent
Kawaguchi et al.

(10) Patent No.: US 8,347,298 B2
(45) Date of Patent: Jan. 1, 2013

(54) AUTONOMOUS DISTRIBUTED CONTROL INVOLVING CONSTRAINT ON RESOURCES

(75) Inventors: Junichiro Kawaguchi, Kanagawa (JP); Osamu Mori, Kanagawa (JP); Yuichi Tsuda, Kanagawa (JP); Koji Nakaya, Kanagawa (JP)

(73) Assignee: Japan Aerospace Exploration Agency, Tokyo (JP)

( * ) Notice: Subject to any disclaimer, the term of this patent is extended or adjusted under 35 U.S.C. 154(b) by 1368 days.

(21) Appl. No.: 11/866,366

(22) Filed: Oct. 2, 2007

(65) Prior Publication Data

US 2008/0082981 A1    Apr. 3, 2008

(30) Foreign Application Priority Data

Oct. 2, 2006  (JP) ................................. 2006-270810

(51) Int. Cl.
*G06F 9/46* (2006.01)
(52) U.S. Cl. ...................................... 718/104
(58) Field of Classification Search .................... 718/104
See application file for complete search history.

(56) References Cited

U.S. PATENT DOCUMENTS

| | | | |
|---|---|---|---|
| 5,742,772 A | 4/1998 | Sreenan | |
| 6,243,396 B1 | 6/2001 | Somers | |
| 6,459,683 B2 | 10/2002 | Busuioc et al. | |
| 6,732,019 B2 | 5/2004 | Spool et al. | |
| 6,801,819 B1 | 10/2004 | Barto et al. | |
| 6,842,899 B2 | 1/2005 | Moody et al. | |
| 6,859,927 B2 | 2/2005 | Moody et al. | |

FOREIGN PATENT DOCUMENTS

| | | |
|---|---|---|
| JP | 05 250298 | 9/1993 |
| JP | 06 028378 | 2/1994 |
| JP | 06-077997 | 3/1994 |
| JP | 07 006142 | 1/1995 |
| JP | 07 006157 | 1/1995 |
| JP | 09 116540 | 5/1997 |
| JP | 09 204436 | 8/1997 |
| JP | 09 231148 | 9/1997 |
| JP | 09 237215 | 9/1997 |

(Continued)

OTHER PUBLICATIONS

Translation of JP06077997, 17 pages.*

(Continued)

*Primary Examiner* — Chun Cao
*Assistant Examiner* — Xuxing Chen
(74) *Attorney, Agent, or Firm* — Blakely, Sokoloff, Taylor & Zafman LLP

(57) ABSTRACT

Disclosed is a distributed control method of cooperatively allowing a control strategy for satisfying a constraint on an aggregated resource and simultaneously achieving or maintaining a performance of a system to be determined in a real-time manner by any one of a plurality of entities which have the highest need for the resource at any given time, without providing a specified management entity. The proposed method or "card game scheme" of the present invention is designed to dynamically carry out a function of satisfying a constraint on an aggregate resource and simultaneously achieving or maintaining a performance of the entire system, based on a distributed control with high flexibility, wherein an "agent", i.e., a software having a function of performing autonomous determination and control, is set in each of the entities, to allow the entities to dynamically take turns to perform a processing of determining a strategy for resource allocation.

11 Claims, 20 Drawing Sheets

FOREIGN PATENT DOCUMENTS

| | | |
|---|---|---|
| JP | 09-237255 | 9/1997 |
| JP | 09 297689 | 11/1997 |
| JP | 11 502646 | 3/1999 |
| JP | 11 272641 | 10/1999 |
| JP | 2000-222374 | 8/2000 |
| JP | 2001 511555 | 8/2001 |
| JP | 2003-009197 | 1/2003 |
| JP | 2003 519945 | 6/2003 |
| JP | 2003 186707 | 7/2003 |
| JP | 2003 296148 | 10/2003 |
| JP | 2003 296149 | 10/2003 |
| JP | 2005 006145 | 1/2005 |
| WO | WO 96/29665 | 9/1996 |
| WO | WO 99/05593 | 2/1999 |
| WO | WO 01/50325 | 7/2001 |

OTHER PUBLICATIONS

Translation of JP09237255, 29 pages.*
Office Action for corresponding Japanese Patent Application No. 2006-270810, 3 pgs., (Feb. 14, 2011).

* cited by examiner

*1: DEPENDING ON CONDITIONS, HEATER OF HOST CAN BE IN OFF STATE

AUTONOMOUS DISTRIBUTED CONTROL INVOLVING CONSTRAINT ON RESOURCES

CROSS-REFERENCE TO RELATED APPLICATIONS

The present patent application claims priority from Japanese Patent Application No. 2006-270810, filed on Oct. 2, 2006.

BACKGROUND OF THE INVENTION

1. Field of the Invention

The present invention relates to a cooperative autonomous distributed control method, in an environment having a constraint on a resource availability for a system to be controlled, such as distributing power or aggregating data traffic under the limited flow and flux rate constraint, adapted to allow a strategy for reliably satisfying the constraint and simultaneously achieving or maintaining respective predetermined performances specifications at each entity in a system, via an autonomous adaptation mechanism by each entity member, which has the highest need for the resource to be allotted to itself at any given instance and also takes turns to play the role, without providing a system a centralized management entity.

2. Description of the Related Art

First of all, key terms to be used in the specification and the appended claims will be summarized as follows:

"Resource": a manipulated variable (i.e., control variable), such as electric power or data traffic (i.e., data flow rate), to be input into a system within a unit time;

"Power Amount": an integrated index of the input power;

"Information Amount": an integrated index of the input data traffic;

"Performance": an index of state pursued such as temperature, buffer utilization ratio or the like;

"Entity": a constituent element of the system, such as a subsystem or a component, which is distributedly allocated to each location;

"Management Entity": any one of the entities which serves as a central server having authority to determine a strategy of the system, at any given instance;

"Network": a channel or a mechanism which allows information to be exchanged between respective ones of the entire entities of the system;

"Bidding": Sending out (i.e., transmitting) a tender request to the entire entities via the network, wherein information responding thereto will be reported from the entities;

"Reporting": in response to the tender request, reporting back to the entity having the server's authority, by issuing, when the performance is below a lower limit index, an On Card describing along with a difference index between the lower limit index and a current performance index, or a Coast Card describing along with a difference index between a nominal turn-on interval index and an elapsed number of time-frames after the latest turn-on instance, or by issuing, when the performance is above an upper limit index, a Skip Card;

"Evaluating": Based on the tendered information, selecting one of the entities which tenders information with a maximum evaluation index;

"Committing": Executing a control operation;

"Shifting": Delegating the authority of the management entity to another one of the entities;

"Agent": a software provided in each of the entities and configured to allow the entity to make an autonomous determination;

"Time Frame": a predetermined time width during which electric power is input, i.e., a time interval during which one cycle of the functions of bidding, evaluating, committing and shifting is performed; and "Interval": a numerical index which represents a time interval during which each of the entities performs the functions, by the time frame.

Depending on adequacy of initiation/discontinuation of resource consumption associated with execution (i.e., commitment) of respective controls for a plurality of entities of a system, such as activating/deactivating of a train's power system, turn-on/turn-off of an air-conditioner in business offices and households, or turn-on/turn-off of heaters in various sections of a satellite, an amount of resource consumption is likely to go beyond a capacity of the resource supply capability to the entire system (distributing power or aggregating data traffic). This problematic phenomenon is often seen in many large-scale systems, where it results in deterioration in efficiency of effective resource utilization. Moreover, the phenomenon causes occurrence of major power outage, crash of communication functions due to access concentration, or deterioration in power utilization efficiency of a satellite system.

There has been known a technique of providing a specified management entity in a system and allowing a control strategy for satisfying a constraint on an aggregated resource by the determination at the specified management entity. There has also been known a technique of allowing a control strategy for achieving or maintaining a performance of the entire system to be cooperatively determined by each entity distributed in the system. However, no technique has existed which is designed to determine a control strategy for satisfying both the requirements, i.e., to allow a control strategy for satisfying a constraint on an aggregated resource and simultaneously achieving or maintaining a performance of the entire system to be cooperatively determined by each entity autonomously and distributedly.

The following Patent Publication 1 relates to an operational technique for a computer in an environment having a constraint on a memory resource. This technique is different from a dynamic/adaptive-type distributed control configured to satisfy a resource constraint, as set forth in the present invention, and the problem in the "Background of the Invention" remains unsolved.

The following Patent Publications 2, 3 relate to a technique for efficiently performing file relocation in a computer within a short period of time. This technique is different from the dynamic/adaptive-type distributed control configured to satisfy a resource constraint, as set forth in the present invention, and the problem in the "Background of the Invention" remains unsolved, The following Patent Publication 4 relates to a method of evaluating a performance of remote calling to be performed between computers. This method is different from a control method as set forth in the present invention, and the problem in the "Background of the Invention" remains unsolved.

The following Patent Publication 5 relates to a technique for distributedly arranging and inserting a plurality of registers in a computer. This technique is different from the dynamic/adaptive-type distributed control configured to satisfy a resource constraint, as set forth in the present invention, and the problem in the "Background of the Invention" remains unsolved.

The following Patent Publication 6 relates to a technique of supporting the uneven memory access for operating systems, in which virtual and physical memories are allocated by using plural memory pools and frame treasuries. This technique deals with use of the virtual resource and is different from the dynamic/adaptive-type distributed control configured to satisfy a resource availability constraint, as set forth in the present invention, and the problem in the "Background of the Invention" remains unsolved.

The following Patent Publication 7 relates to a system designed so that the resources that the deleted function uses are released and used by other functions through a monitoring processor. In contrast, a control scheme of the present invention has no need for providing such a specified monitoring management entity. Further, instead of the approach of creating a free resource, the scheme of the present invention is configured such that a plurality of entities take turns cooperatively to perform a processing of dynamically allocating a resource to respective entities consuming the resource. Thus, the system disclosed in the Patent Publication 7 is totally different from the scheme of the present invention, and the problem in the "Background of the Invention" remains unsolved.

The following Patent Publication 8 relates to a search control for an information service computer. This control is different from a control configured to dynamically allocate a resource to each entity consuming the resource under resource constraint, as set forth in the present invention, and the problem in the "Background of the Invention" remains unsolved.

The following Patent Publication 9 relates to a management system for a discard priority processing in a computer. This system is different from the dynamic/adaptive-type control scheme as set forth in the present invention, and the problem in the "Background of the Invention" remains unsolved.

The following Patent Publication 10 relates to a technique for allocating a resource. This technique is different from the scheme configured to solve a problem in control under a given resource constraint based on a distributed processing, as set forth in the present invention, and the problem in the "Background of the Invention" remains unsolved.

The following Patent Publication 11 relates to a technique for dividing a resource into two or more. This technique is different from the scheme configured to dynamically allocate a resource to each entity consuming the resource without division of a resource, as set forth in the present invention, and the problem in the "Background of the Invention" remains unsolved.

The following Patent Publication 12 relates to a technique for ASIC (application specific integrated circuits) design. This technique is different from a control scheme configured to dynamically allocate a resource to each entity consuming the resource under resource constraint, as set forth in the present invention, and the problem in the "Background of the Invention" remains unsolved.

The following Patent Publications 13, 14 relate to a technique for simultaneously performing a resource reallocation processing in all entities. This system assumes every information in the system are shared among all entities (agents) and is different from the scheme of the present invention in which the number of entities determining and executing a strategy is limited to one at any given time without a specified management entity. Moreover, the technique disclosed in the Patent Publications 13, 14 includes the step of evaluating respective improvement amounts in the entire entities. Differently from this technique, the method of the present invention has no need for such an evaluation. The present invention does not request processing at the entities other than an instantaneous server entity, and the system is free from computational and communication burdens.

The following Patent Publication 15 relates to a technique for defining planning and resource allocation separately. This technique is different from the control scheme configured to dynamically allocate a resource to each entity consuming the resource under resource constraint, as set forth in the present invention.

The following Patent Publication 16 relates to a technique specialized in data compression. This technique is different from the control scheme configured to dynamically allocate a resource to each entity consuming the resource under resource constraint, as set forth in the present invention.

The following Patent Publication 17 relates to a technique for solving conflicts by means of an exception handler. This technique is different from the control scheme configured to dynamically allocate a resource to each entity consuming the resource under resource constraint, as set forth in the present invention.

The following Patent Publications 18, 19 relate to a technique for performing a resource management based on a graph. This technique is different from the control scheme configured to dynamically allocate a resource to each entity consuming the resource under resource constraint, as set forth in the present invention.

A technique disclosed in the following Patent Publication 20 is different from the scheme of the present invention designed to dynamically allocate a bidding agent without a specified management entity.

The following Patent Publications 22, 23, 24 relate to a technique based on a specified management entity. This technique is different from the control scheme configured to dynamically allocate a resource to each entity consuming the resource under resource constraint, as set forth in the present invention.

[Patent Publication 1] JP 2005-006145A
[Patent Publication 2] JP 2003-296149A
[Patent Publication 3] JP 2003-296148A
[Patent Publication 4] JP 2003-186707A
[Patent Publication 5] JP 11-272641A
[Patent Publication 6] JP 09-237215A
[Patent Publication 7] JP 09-231148A
[Patent Publication 8] JP 09-204436A
[Patent Publication 9] JP 09-116540A
[Patent Publication 10] JP 06-028378A
[Patent Publication 11] JP 05-250298A
[Patent Publication 12] JP 11-502646A
[Patent Publication 13] JP 09-297689A
[Patent Publication 14] JP 07-006157A
[Patent Publication 15] JP 07-006142A
[Patent Publication 16] JP 2003-519945A
[Patent Publication 17] JP 2001-511555A
[Patent Publication 18] U.S. Pat. No. 6,859,927
[Patent Publication 19] U.S. Pat. No. 6,842,899
[Patent Publication 20] U.S. Pat. No. 6,801,819
[Patent Publication 21] U.S. Pat. No. 6,732,019
[Patent Publication 22] U.S. Pat. No. 6,459,683
[Patent Publication 23] U.S. Pat. No. 5,742,772
[Patent Publication 24] U.S. Pat. No. 6,243,396

As mentioned above, depending on adequacy of initiation/discontinuation of resource consumption in respective entities of a system as shown in FIG. 1, such as activating/deactivating of a train's power system or turn-on/turn-off of an air-conditioner, a problem that an amount of resource consumption goes beyond a capacity of resource supply to the entire system is often seen in many large-scale systems. Although a power supply capacity required for each entity is averagely an extremely low index, it has to be set to avoid an undesirable situation where a peak of resource consumption appears due to simultaneous initiation of resource consumptions in the entities as shown in FIG. 2.

Unfortunately, with a certain probability, these systems take an operational risk due to excessive resource consumption. This problematic phenomenon is also observed during concentration of data traffic in a data acquisition bus or momentary concentration of access in mobile communication. A solution for these problems is how to dynamically allocate a resource to each entity consuming the resource shared in terms of time, and simultaneously achieve or maintain a target performance of the entire system, under constraint on an available resource.

Specifically, as shown in FIG. 3, a specified management entity may be provided in a certain facility or apparatus to perform an operation of collecting data about a need for resource supply/consumption in a system, and flattening the collected data rate in a time-division manner, so as to solve the above problem as shown in FIG. 4. In fact, a dedicated processing unit (manager) adapted to carry out the above function in a certain cycle is used for thermal control in an actual satellite, so as to re-allocate a resource to achieve an effect of flattening a power supply/consumption rate while suppressing a peak of the power supply/consumption.

This technique can be applied only to a system having a predetermined configuration. That is, if a new component (entity) is added, or an existing component (entity) is removed, or if a plurality of existing components are rearranged, the control system has to be fundamentally reconfigured. Actually, a satellite system, such as a thermal control system, will be obliged to be reconfigured every time a new satellite is designed. Moreover, the scheme using a specified management entity involves a risk that a failure of the specified management entity directly leads to a failure of the entire system, and has the problem about excessive increase in instrumentation such as harness and cables for implementation. In addition, the system verification requires tremendous time and budgets.

In view of achieving the above function in any type of system in a general-purpose manner, it is essential to establish a scheme capable of determining a strategy without providing a specified management entity. This scheme means a control configured to satisfy a constraint on a resource availability while maintaining an operating state and allowing separation/integration or collection/distribution of the resource.

As above, there is the need for a control scheme capable of determining a strategy for satisfying a constraint on a predetermined aggregated resource and simultaneously achieving or maintaining a performance of each entity, without providing a specified management entity, and robust against changes in system configuration.

SUMMARY OF THE INVENTION

In view of the above circumstances, it is an object of the present invention to propose a novel method, or "card game scheme", of dynamically carrying out a function of satisfying a constraint on a resource availability and simultaneously achieving or maintaining a performance of the entire system, based on a cooperative autonomous distributed control with high flexibility, wherein an "agent", i.e., a software having a function of performing autonomous determination and control, is set in each of a plurality of entities, to allow the entities to dynamically take turns to perform a processing of determining a next step strategy for resource allocation, without specifying the agent serving as a management entity having an authority to determine the strategy, so as to provide a processing method with high versatility.

In order to achieve this object, the present invention provides a method foe satisfying a constraint on an aggregated resource to be input into a system, and allowing a specific performance in each of a plurality of entities of the system to be brought into conformity with a predetermined target index or maintained at the target index. The system includes a mechanism for supplying a certain amount of constraint resource required for the system, and a network adapted to connect between respective ones of the entities so as to allow data about resource consumption and performance in each of the entities to be exchanged therebetween. Each of the entities is adapted to be assigned with a target index with which the specific performance is to be bought into conformity within a predetermined allowable range of the target index, and an initial interval reference index during which the resource is input thereinto. Each of the entities comprises: means for carrying out a function of committing a control operation of effecting the specific performance, or an actuation device, which is adapted to consume the input resource in a known amount; a function of measuring the specific performance, or means for carrying out a function of measuring a resource consumption index therein; means for carrying out a transmitting/receiving function of transmitting and receiving data to/from the network; means for carrying out a resource acceptance function of accepting the input resource; and means for carrying out a software function (agent) of autonomously determining a strategy. Further, the entities are designed to take turns cooperatively to commit the control.

In order to achieve this object, the present invention provides a method for use in a system which includes a plurality of entities each adapted to exhibit a specific performance while consuming a resource, a mechanism adapted to supply the resource to each of the entities, a mechanism provided in each of the entities to accept the resource; and means provided in each of the entities to carry out a committing function of effecting the specific performance or an actuation device provided in each of the entities to effect the specific performance. The method is designed to satisfy a constraint on an aggregated resource to be input from the resource supply mechanism into the entire system, and simultaneously control the respective specific performances of the entities. The method comprises the steps of: providing a network adapted to connect between respective ones of the entitles so as to allow data about the resource consumption and the specific performance in each of the entities to be exchanged therebetween, and communication means having a function of transmitting and receiving the data; assigning to each of the entities a target index with which the specific performance is to be brought into conformity within an allowable range around the target index; assigning to each of the entities an interval reference index during which the resource is input into the entity; providing means for carrying out a function of measuring the specific performance or the resource consumption in each of the entitles; providing to each of the entitles means for carrying out a software function of autonomously determining a strategy; and allowing the entities to take turns cooperatively to perform the software function. In a preferred embodiment of the present invention, the software function (agent) includes: pre-assigning, to each of the entitles, an initial interval reference index during which the resource is consumed; dynamically sifted between two roles of a server and a client, dynamically performing four actions of the server consisting of bidding, evaluating, committing and shifting, or an action of the client consisting of reporting, so as to allow the entities to distributedly and cooperatively perform a processing of determining a strategy for the entire system. In this manner, a new control scheme ("card game scheme") is achieved without providing a specified management entity for determining a strategy (FIG. 6).

In a preferred embodiment of the present invention, the software function (agent) in any selected one of the entities whenever the role of the server is delegated thereto according to the shifting action, includes: committing the resource consumption in the selected entity to bring the specific performance into conformity to the target index or maintain the specific performance at the target index; performing the bidding action to collect first data about a difference between an actual specific performance and the target index in each of the remaining entities and second data about a difference between the assigned interval reference index allowing the resource to be consumed at a predetermined index, and an actual number of time-frames in an elapsed time period after a latest turn-on instance in each of the remaining entities; performing the evaluating action to select one of the remaining entities which is to be allowed to commit the resource consumption in a subsequent time-frame; and performing the shifting action to delegate an authority to determine the strategy (FIG. 7).

In a preferred embodiment of the present invention, the software function (agent) in each of the remaining entities other than the server includes, in response to a tendering request from the server, reporting a status of the specific performance and the resource input in the entity.

In a preferred embodiment of the present invention, the software function (agent) in each of the remaining entities other than the server includes, in response to a tendering request from the server, reporting first data about a difference between an actual specific performance and the target index in each of the remaining entitles, and second data about a difference between the assigned reference interval index allowing the resource to be consumed at a predetermined index, and an actual number of time-frames in an elapsed time period after a latest turn-on instance in each of the remaining entities, in the form of three types of Cards consisting of: an On Card (performance deviation Card) which is issued when the actual specific performance is below a lower limit of the allowable range; a Coast Card which is issued when the actual specific performance falls within the allowable range, the Coast Card being indicative of a difference between the assigned interval reference index and an actual number of time-frames in an elapsed time period after a latest turn-on instance; and a Skip Card which is issued when the actual specific performance is above an upper limit index of the allowable range, the Skip Card being indicative of no need for positively consuming the resource.

In a preferred embodiment of the present invention, the software function (agent) in the server includes, during the evaluating action based on the collected first and second data which contains one or more On Cards, selecting, as a next server, one of the remaining entity which has issued the On Card having a largest difference index, and, during the evaluating action based on the collected first and second data which contains no On Cards and one or more Coast Card, selecting, as a next server, one of the remaining entity which has issued the Coast Card having a largest difference index.

In a preferred embodiment of the present invention, the software function (agent) in each of the remaining entities other than the server includes avoiding issuing the Skip Card on a case-by-case basis.

In another embodiment of the present invention, the software function (agent) in the server includes, during the committing action, clearing an index of the Coast Card in each of the remaining entities to zero, and subsequently continuing the committing action with reference to the initially assigned interval reference index.

In another embodiment of the present invention, the software function (agent) in the server includes, during the committing action, clearing an index of the Coast Card in each of the remaining entities to zero, and then adaptively controlling each of the remaining entitles based on an actual performance thereof after an operation of adjusting and updating the interval reference index with reference to the pre-cleared index of the Coast Card.

In another embodiment of the present invention, the software function (agent) in the server includes, during the committing action, integrating respective interval reference indexes updated according to the adaptive control in the remaining entitles, and multiplying each of the interval reference indexes in the remaining entitles by a certain coefficient which allows the updated interval reference indexes through the multiplication to be matched to an aggregated resource specified based on the integrated index.

In another embodiment of the present invention, the method includes the steps of normalizing respective resource consumption indexes to be determined for the entities, at a same index.

In the method of the present invention, when the system is a heating system and/or a cooling system, the resource may be electric power, and the specific performance in each of the entities may be temperature.

Alternatively, when the system is a data input-output system, the resource may be a segmented data traffic, and the specific performance in each of the entities may be a utilization efficiency of a buffer device.

In a preferred embodiment of the present invention, the network of the system is installed concurrently with and along a line for supplying the resource.

As above, according to the method of the present invention, a plurality of entities of a system can dynamically take turns cooperatively to serve as a server so as to satisfy a constraint on a limited aggregated resource of the system and simultaneously allow a specific performance in each of the entities to be brought into conformity with a predetermined target index or maintained at the target index, without providing a specified management entity. That is, a distributed control scheme can be effectively achieved.

The server function of the present invention allows a role or authority of the server to be effectively allocated so as to significantly increase flexibility of reconfiguration, disassembly/assembly of the entities in the system.

The method of the present invention makes it possible to avoid a risk of breakage of the entire system due to failure of a management entity, and prevent failure of a part of the entities from adversely affecting the entire system, so as to provide enhanced resistant to failure.

The method of the present invention includes the bidding process and the evaluating process. This makes it possible to facilitate detecting failure in each of the entities so as to eliminate the failure in an early stage.

In the method of the present invention, no centralized management entity is employed. Thus, a measurement line for connecting between the centralized management entity and each of the remaining entities can be drastically simplified to accelerate reduction in weight and size.

The method of the present invention makes it possible to reduce a time necessary for test and reconfiguration of the system so as to facilitate reduction in costs for system construction.

The method of the present invention can be converted into hardware as a versatile and uniformed module, and the agents can be uniformly designed.

The method of the present invention allows a constraint on a resource in a system to be reliably satisfied.

An applied function of the present invention can be utilized to provide enhanced utilization efficiency of an aggregated resource. The method of the present invention makes it possible to optimize a system by adaptively releasing an excess resource without the need for fully evaluating an improvement rate of the entire system.

The method of the present invention makes it possible to preclude association of an unnecessary agent so as to establish a compact system.

In the method of the present invention, the number of the agents can be limited to one at any given time, to eliminate confliction.

The method of the present invention can be applied to various systems.

The method of the present invention makes it possible to readily upgrade a system to have a higher function while maintaining an operating state.

This invention flexibly admits any new entities to join in the system and also flexible admits some entities to leave the system, without need to reconstruct the system management. This leads to significant reduction of the resume time required to cope with the system alteration.

These and other objects, features and advantages of the present invention will become more evident through the following detailed description along with the accompanying drawings.

DESCRIPTION OF THE PREFERRED EMBODIMENTS

Figure 1:
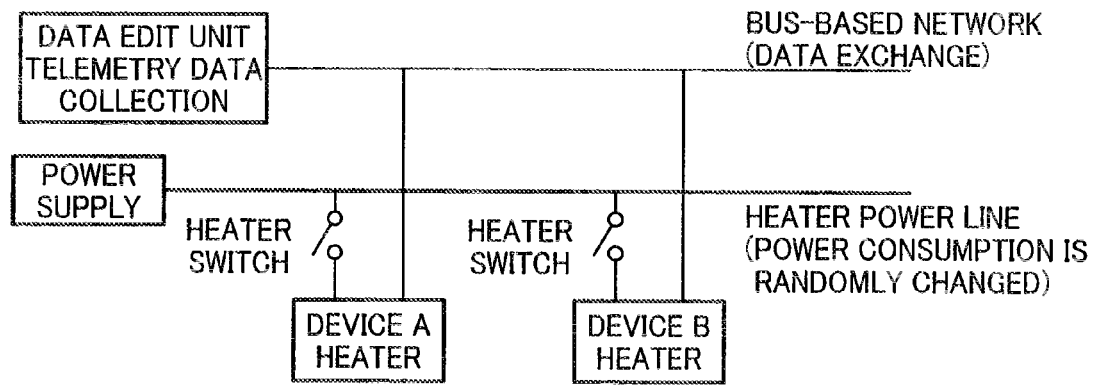
FIG. 1 is a block diagram showing one example of a system designed to allow a plurality of entities to perform a control independently.
Figure 2:
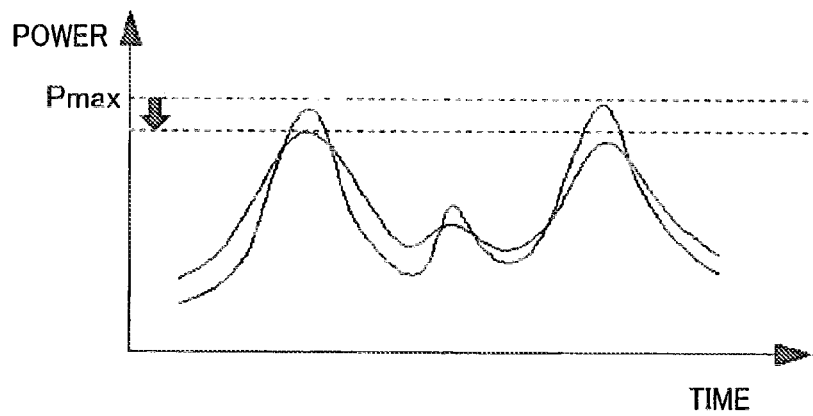
FIG. 2 is a graph showing one example of a hysteresis of an aggregated resource (power) consumption in a system designed to allow a plurality of entities to perform a control independently.
Figure 3:
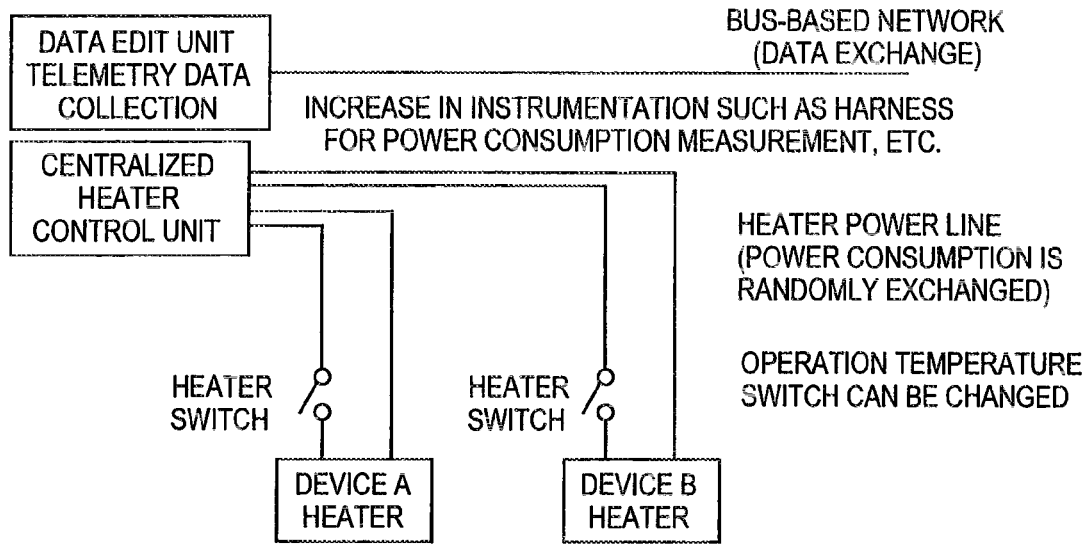
FIG. 3 is a block diagram showing one example of the configuration of a system provided with a specified management entity (centralized management control unit).
Figure 4:
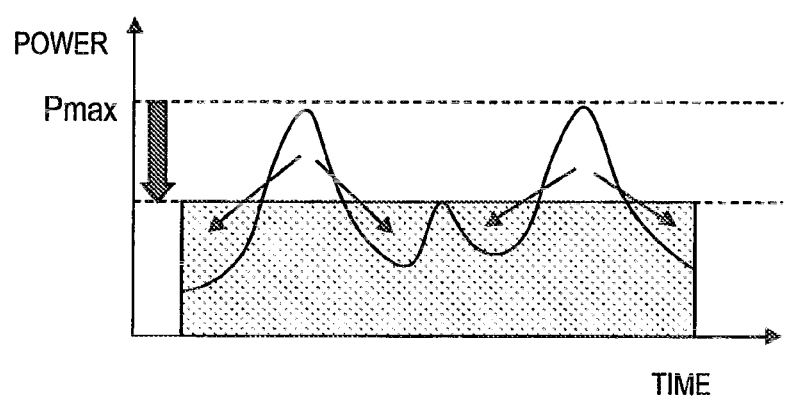
FIG. 4 is a graph for explaining a concept of flattening the rate based on a control scheme configured to satisfy a constraint on an aggregated resource.

[Mathematical Explanation and Outline of Control Logic]

A scheme of the present invention will be mathematically described together with a control logic thereof, by taking as an example a satellite heater control system wherein a resource is electric power, and a performance is a temperature in each entity.

In the following description, "T" is a vector obtained by arranging temperatures $T_i$ at respective control point i of a plurality of entities, and "q" is an index obtained by appropriately normalized heater power input to each entity. A key point of the satellite heater control is to allow a performance index of T to fall within an allowable range around (or having a center at) a predetermined target valve T* in an after-mentioned system.

$$\dot{T}=AT+Bq,$$

wherein "A" is a matrix representing a process of thermal coupling and dissipation in the control points, and "B" is a matrix representing a mechanism for supplying a normalized heater input power corresponding to "q".

In usual controls, a heater in each of the entities is turned on according to the following logic to input a power so as to increase the temperature up to the target index, or maintain the temperature at the target index;

$$q = \begin{cases} (T^* - T), & \text{if } T^* > T, \\ 0, & \text{if } T^* < T. \end{cases}$$

In this case, "A" is generally a moderate dissipation mechanism. Thus, for example, "A" and "B" may be simply expressed as follows:

$$A \cong -\alpha 1, B \cong b$$

When ($\alpha/b$) becomes sufficiently small, the temperature reaches an equilibrium temperature as follows:

$$\overline{T} = \frac{b}{b+\alpha}T^* = \frac{1}{1+(\alpha/b)}T^* \cong T^*$$

During a course of transient response, a power consumption index is not constant.

As to an aggregated power to be allocated, instead of being based on a power for obtaining the equilibrium temperature satisfying the above formula, in consideration of the possibility that respective heater switches of the entities are simultaneously turned on by coincidence, a maximum peak power has to be ensured as a resource supply capacity.

In a duty cycle-controlled heater control scheme, if an estimate index ($\tilde{\alpha}/b$) of a dissipation factor per heater input power is known to some extent, an equilibrium temperature can be obtained as follows according to a control of $q=(\tilde{\alpha}/b)T^*$:

$$\overline{T} = \frac{\tilde{\alpha}}{\alpha}T^* \cong T^*$$

This means that a thermal control can be achieved based on an open loop manner as long as a numerical model has adequate accuracy. The tilde symbol indicates an estimate index. A power necessary for this control may be the following fixed index:

$$J=(b, b, \ldots, b)q=i^T\tilde{\alpha}T^*$$

wherein $$i^T=(1,1,,,1)$$

An amount of input heat corresponds to an average input power per given unit time. In each of the entities, a power supply can be turned on for a certain interval during which a predetermined power is consumed, so as to achieve the control. This control will hereinafter be referred to as "fixed duty-cycle control".

Due to an open loop system, the fixed duty-cycle control has a problem that a control performance is susceptible to error of a numerical model, and a final temperature does not become equal to the targeted index, differently from the above formula.

From this point of view, an input power or a turn-on interval may be updated according to a strategy described by the following formula:

$$q_{k+1}=q_k-\beta\{(\tilde{\alpha}_k-\alpha)/b\}T^*$$

wherein $\beta$ is an adjustable parameter.

In this case, $$\tilde{\alpha}_{k+1}=\tilde{\alpha}_k-\beta(\tilde{\alpha}_k-\alpha)=(1-\beta)\tilde{\alpha}_k+\beta\alpha$$

If $2>\beta>0$, $\tilde{\alpha}_\infty$ can be reliably set at a to compensate for error of the numerical model.

In this case, it is understood that the input heat is changed as follows:

$$J=i^T\tilde{\alpha}T^* \rightarrow i^T\alpha T^*$$

This control scheme is configured to quasi-statically change an aggregated power amount, so as to control a temperature as a performance of each of the entities while satisfying a constraint on an allocatable resource amount. This control scheme will hereinafter be referred to as "integral compensation-type or adaptive-type duty cycle control.

A key point of a temperature control under a power constraint can be said to optimize the following "f" so as to determine an input power to satisfy the constraint and simultaneously control a predetermined performance with high accuracy, i.e., determine an interval index (duty-cycle rate) of power input:

$$f = \frac{1}{2}(AT^* + q)^T Q(AT^* + q) + \mu(i^T q - J),$$

wherein "Bq" is rewritten to "q".

A solution of this formula is given as follows:

$$q \cong -AT^* + \frac{1}{n}(J + i^T AT^*) = q_{nominal} + \frac{1}{n}(J + i^T AT^*)$$

In one aspect, the present invention can be regarded as a process of converting this optimization operation to a distributed processing operation so as to sequentially calculate a solution in a real-time manner. That is, while this solution can be calculated by a centralized management using a dedicated heater control unit, the present invention is designed to calculate the solution based on a distributed control in place of this centralized control.

On the assumption that a power consumption index per time frame in each entity is known, it never loses a generality. An input power in each entity means a sum of the known fixed power consumption indexes in ON time frames. The following description will be made on the assumption that each of a plurality of entities has a common fixed power consumption index, for simplifying explanation. In actual systems, this assumption is realistic and reasonable. When a specific one of the entities has a heater having a relatively high index of average required power, this situation can be considered such that the specific entity requires a higher duty-cycle rate. The duty-cycle rate means a numerical index representing after how many time frames a heater, i.e., a heater switch, is turned on. Based on this concept, a control logic can be configured such that a power is consumed only in any one of the entities within a predetermined period of time, to keep power consumption constant in the entire system. In a large-scale system, after dividing the entire system into an appropriate number of sub-systems, this control scheme may be applied to each of the sub-systems.

In the present invention, based on the above control scheme, a card game scheme is additionally used as a distributed processing process. In order to achieve a system configuration without a specified management entity, it is necessary to install a common control logic in each of the entities so as to allow any one of the entities to serve as a server and also serve as a client.

The present invention proposes a control logic configured to give a permission of commitment and an authority to determine a strategy, to a highest-priority one of the entities which requires the largest amount of input power, at any given time, i.e., to allow the entitles to take turns to become a server entity carrying out a server function cooperatively. Each of the entities performs four operations: 1) committing power consumption (turning on power input); 2) bidding; 3) evaluating; and 4) shifting a server function to another entity. While the first operation of committing power consumption is not essentially performed at the beginning of these operations, the second to fourth operations must be performed in this order.

During the bidding, a server entity at the time is operable to issue a request for issuing/reporting a data card. The card to be reported from each of the entities includes three types: an On Card; a Coast Card; and a Skip Card. As mentioned above, an interval index of power input is initially pre-stored in each of the entities. The On Card is issued when a temperature of the entity is below a low limit index of an allowable range associated with a predetermined nominal temperature, and a deviated temperature difference is recorded therein. More specifically, a larger negative index is recorded therein as the temperature is more largely below the lower limit index. The Coast Card is issued when a temperature of the entity falls within the allowable range, and a difference between a preset turn-on interval index and an elapsed time-frame number after the latest turn-on of the entity. More specifically, a larger negative index is recorded therein as an elapsed time without turn-on after passing over the preset turn-on interval index becomes greater. The Skip Card is issued when a temperature of the entity is above an upper limit index of the allowable range, to declare that the entity does not positively request to input a power. It is not essential to issue the Skip Card.

During the evaluation, one of the entities which have issued the On Cards having a largely deviated temperature difference (negative index) is selected as the highest priority entity. And, if there is no On Card, one of the entitles which has issued the Coast Card having a largest elapsed time (negative index) after passing over the preset turn-on interval index is selected. The selected entity is defined as a management entity, i.e., server, in a subsequent time frame.

During the shifting, if necessary, data obtained through the bidding, such as a turn-on interval index table, may be transferred to the next server. Such a data transfer is not essential to the present invention. Specifically, although a fundamental operation does not involve the data transfer in conjunction with the shifting, the data transfer processing may be employed when a particular applied function is introduced.

Specifically,

1. In a most fundamental fixed duty-cycle control, an index of an elapsed time-frame number after the latest turn-on of each entity, to be referred to and recorded in a Coast Card, is simply cleared to zero every duty cycle;

2. In integral or adaptive-type compensation, when a time advances from "k" to "k+1", an ON duty-cycle index table is updated according to the following data:

$$\tilde{n}_{i,k+1} = \tilde{n}_{i,k} - \beta(\tilde{n}_{i,k} - n_{i,actual}) = (1-\beta)\tilde{n}_{i,k} + \beta n_{i,actual},$$

wherein ni is an ON duty-cycle index of an entity "i", and the suffix "actual" indicates an actual ON duty-cycle index; and 3. In optimization under power constraint, the following data is delivered in the bidding stage, and the ON duty-cycle index table is used after multiplying each of the ON duty-cycle indexes by the delivered data index:

$$\left(\sum_i \frac{1}{n_i}\right) / \left(\sum_i \frac{1}{\tilde{n}_i}\right)$$

[Example Numerical Model]

Figure 9:
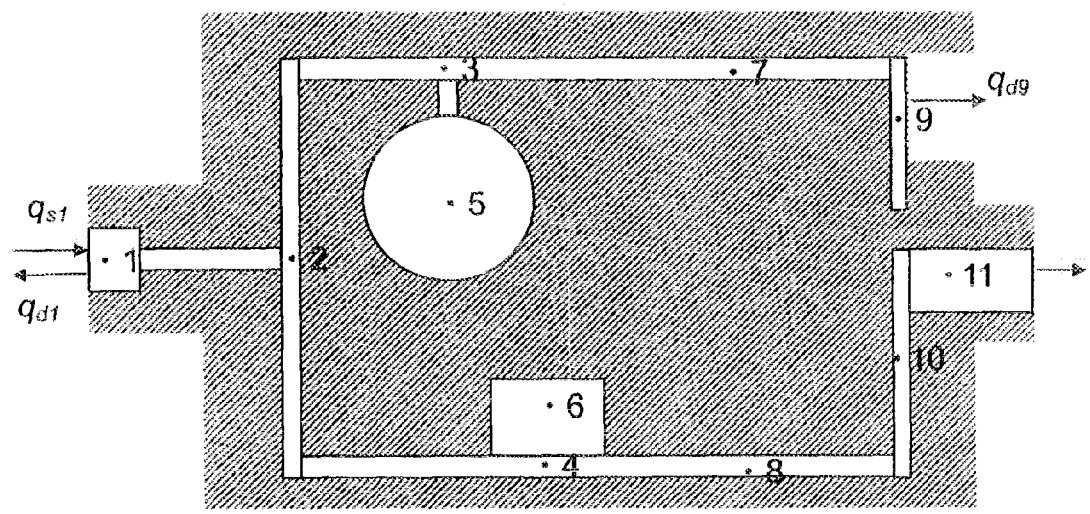
FIG. 9 is a schematic diagram showing one example of the configuration of a simplified temperature control system.
Figure 10:
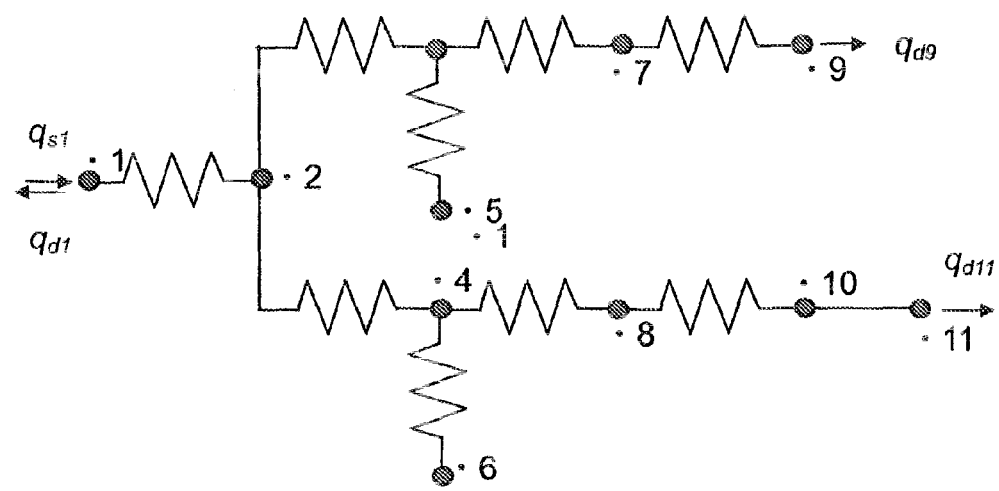
FIG. 10 is a block diagram showing an equivalent system of the simplified temperature control system.

FIG. 9 is one example of the configuration of a simplified heater control system. A task for this system is to control a temperature of each node to be set at a predetermined index. In this system, solar light enters a node 1, and heat is dissipated as radiant heat from respective surfaces of nodes 9, 10. This control system can be translated into an equivalent system as shown in FIG. 10.

In the equivalent system, a temperature and a thermal input from a heater at each of the nodes 1 to 11 are expressed as follows, respectively:

$$T_i (i=1, 2, \ldots, 11)$$

$$q_i (i=1, 2, \ldots 11)$$

Given that a heat capacity of each node is "mi", and a heat transfer coefficient between two nodes i,j is "kij", a temperature change can be expressed as follows:

$$m_1 \dot{T}_1 = -k_{12}(T_1 - T_2) - \ldots$$

$$m_2 \dot{T}_2 = +k_{12}(T_1 - T_2) - k_{23}(T_2 - T_3) \ldots$$

The heat transfer coefficient kij can be expressed as follows:

$$k_{ij} = \kappa_{ij} A_{ij} \frac{1}{L_{ij}},$$

wherein:
κiji is a heat conductivity;
Aij is an equivalent sectional area; and
Lij is an equivalent line length.

Further, an amount of incident solar light is expressed as follows:

$$q_{si} = f_0 \alpha_i A_i$$

wherein:
$f_0$ is an average heat flux from solar light;
Ai is an incidence/radiation surface area; and
αi is a solar light absorptance.

An amount of dissipated heat by radiation is expressed as follows:

$$q_{di} = -\sigma \epsilon_i A_i T_i^4$$

wherein:
σ is a Boltzmann's coefficient;
Ai is an incidence/radiation surface area; and
εi is a radiation rate.

A temperature change of the entire control system is expressed as follows:

$$M\dot{T}=KT+s+d+h$$

wherein:
M is a matrix comprising elements of heat capacity;
K is a matrix comprising elements of relative heat transfer coefficient;
s is an amount of incident solar heat;
d is an amount of dissipated heat by radiation;
h is an amount of heat from a heater.

For example, the matrix is expressed as follows:

$$K = \begin{pmatrix} -k_{12} & k_{12} & \cdot & \cdot \\ k_{12} & -k_{12}-k_{23} & \ldots & k_{23} & \cdot \\ \cdot & & k_{23} & & \cdot & \cdot \\ \cdot & & & \cdot & \cdot \end{pmatrix},$$

wherein each of the matrix elements is a heat transfer coefficient as described above.

Respective vectors of T, s, d and h are expressed as follows:

$$T=(T_1, T_2, \ldots, T_{11})^T, s=(q_{s1},0,0,\ldots,0)^T, d=(q_{d1},0,\ldots q_{d9},0,q_{d11})^T, h=(q_1,q_2,\ldots,q_{11})^T$$

In this numerical model, the elements of the matrix M were set as follows:

M (1,1)=1.0*0.3e3; equivalent to 1 kg of Fe (iron);
M (2,2)=2.0*0.9e3; equivalent to 2 kg of Al (aluminum) panel;
M (3,3)=2.0*0.9e3; equivalent to 2 kg of Al (aluminum) panel;
M (4,4)=2.0*0.9e3; equivalent to 2 kg of Al (aluminum) panel;
M (5,5)=40.0*4.0e3; equivalent to 40 liter of hydrazine ($N_2H_4$) fuel;
M (6,6)=3.0*0.3e3; equivalent to 3 kg of Fe (iron);
M (7,7)=2.0*0.9e3; equivalent to 2 kg of Al (aluminum) panel;
M (8,8)=2.0*0.9e3; equivalent to 2 kg of Al (aluminum) panel;
M (9,9)=1.0*0.9e3; equivalent to 1 kg of Al (aluminum) panel;
M (10,10)=1.0*0.9e3; equivalent to 1 kg of Al (aluminum) panel; and
M (11,11)=3.0*0.3e3; equivalent to 3 kg of Al (aluminum) panel,
wherein the unit is J/deg.

Further, in this simplified model, the elements of the matrix K, i.e., the heat transfer coefficients between the respective nodes, were set as follows:

k (1,2)=4.e3*5.e–3/0.2; equivalent to 4 kW/mK 50 cm² cross section, 0.2 m length;
k (2,3)=4.e3*5.e–3/0.4; equivalent to 4 kW/mK 50 cm² cross section, 0.4 m length;
k (2,4)=4.e3*5.e–3/0.4; equivalent to 4 kW/mK 50 cm² cross section, 0.4 m length;
k (3,5)=4.e3*5.e–3/0.4; equivalent to 4 kW/mK 50 cm² cross section, 0.4 m length;
k (5,9)=4.e3*5.e–3/0.4; equivalent to 4 kW/mK 50 cm² cross section, 0.4 m length;
k (4,6)=4.e3*3.e–3/0.4; equivalent to 4 kW/mK 30 cm² cross section, 0.4 m length;
k (3,7)=4.e3*5.e–3/0.4; equivalent to 4 kW/mK 50 cm² cross section, 0.4 m length;
k (6,8)=4.e3*5.e–3/0.4; equivalent to 4 kW/mK 50 cm² cross section, 0.4 m length;
k (7,9)=4.e3*5.e–3/0.4; equivalent to 4 kW/mK 50 cm² cross section, 0.4 m length;
k (8,10)=4.e3*5.e–3/0.4; equivalent to 4 kW/mK 50 cm² cross section, 0.4 m length; and
k (10,11)=4.e3*5.e–3/0.2; equivalent to 4 kW/mK 50 cm² cross section, 0.2 m length
wherein the unit is W/deg.

Further, the solar light incident amount s (W) and the solar light absorptance were set as follows:

s (1)=1.4e3*0.02*0.2; solar flux at the node 1 with 0.02 m²; and
solar light absorptance=0.2.

The dissipated heat amounts by radiation at the nodes 1, 9, 11 were set as follows:

$d(1)=-\sigma*0.8*0.05*Teq(1)^4$; $\epsilon_1=0.8$, area=0.05 m²;

$d(9)=-\sigma*0.8*0.2*Teq(9)^4$; $\epsilon_9=0.8$, area=0.2 m²; and $d(11)=-\sigma*0.8*0.2*Teq(11)^4$; $\epsilon_{11}=0.8$, area=0.2 m² wherein "^" represents exponentiation.

Just for reference, in this model, under the condition that each of the nodes is kept at 10° C., a steady input power amount in an equilibrium state is calculated as follows:

(9, 0, 0, 0, 0, 0, 0, 0, 58, 0, 58)(W)

That is, the total input power amount is 125 (W). In this case, it was verified that an intended purpose can be achieved using three heaters at most. Specifically, it can be deduced that eleven heaters provided to the respective nodes cause excessive redundancy, and a solution about power allocation to the heaters to achieve an intended temperature distribution is not single. Practically, two heaters provided between the nodes 3, 5 and between the nodes 4, 6 are enough to achieve the intended temperature distribution, and it is obviously redundant to provide the eleven heaters.

Based on this numerical model, a controllability of the system will be discussed according to an inverse approach relative to a process of setting a temperature at each of the nodes to achieve an equilibrium state which is pre-defined as a condition where heater input powers (15, 10, 10, 0, 5, 25, 10, 10, 20, 5, 15) (W) as the redundant solutions are allocated to the respective nodes. In this power allocation, an aggregate power was determined and set at 125 (W) in anticipation of achieving a state close to the above temperature distribution as one example. A temperature at each of the nodes in the equilibrium state under the heater input power allocation is calculated as follows:

(11.1, 11.0, 10.8, 11.0, 10.5, 10.9, 10.6, 10.4, 10.2, 9.6, 9.2) (° C.)

The solutions are contained by solving a fourth degree equation. As seen in the result, this equilibrium state is fairly close to the above state achieved by three heaters, which has a uniform temperature distribution of 10° C. This shows that if the aggregated power 125 (W) is input while keeping a certain distribution, a desired temperature distribution can be determined with insensitivity to individual allocations thereof. In addition, as shown in the result of control of the three heaters, it can be assumed that there are a plurality of solutions about heater input power allocation capable of achieving approximately the same equilibrium temperature distribution.

A time constant in a governing dynamic equation of a temperature hysteresis linearized around a steady temperature is (2.5, 4, 7, 8, 10, 16, 23, 38, 84, 99000, 497) (sec). Thus, it can be said that a control result can be evaluate by a simulation for 500 sec or more.

The aggregate input power of 125 (W) was divided into twenty five segments in units of 5 (W), i.e., discretized to turn on a power of 125 (W) every 40-msec. For example, if a heater requires to allocate a power of 15 (W) thereto, a duty-cycle sequence may be configured to turn on the heater three times per second by a pulse having a time width of 40-msec.

On the assumption that the same operation as above is performed for all the heaters, an interval (duty-cycle index) for allowing each of the heaters to be turned on therewithin is calculated as follows: (8.3, 12.5, 12.5, 25, 25, 5, 12.5, 12.5, 6.25, 25, 8.3) (–). This model was designed such that even a heater at a certain node having zero power to be allocated has an opportunity to be turned on once per second. Thus, an apparent aggregate power was increased to 130 W.

A numerical model simulation was performed to evaluate the following three types of control schemes.

1) Control scheme based on fixed duty-cycle
2) Control scheme based on on/off control and target temperature
3) Control scheme based on applied control logic In a numerical model using the applied control, a scheme (A) configured to reset an index to be described in a Coast Card in a more simplified manner, a scheme (B) configured to update a duty-cycle index in an adaptive manner, and a scheme (C) configured to designate and update all heater input powers in an adaptive manner, will be comparatively shown. The scheme (C) is the most advanced method of transferring Coast table data of all components to perform an optimization operation (see "Summary of the invention"). While the scheme (B) is not configured to exchange table data between components, it can optimally update a duty-cycle table in an adaptive manner, and automatically control aggregate heater input-power index to be maintained constant.

(Numerical Model-1: Fixed Duty-Cycle Rate Control)

Figure 11:
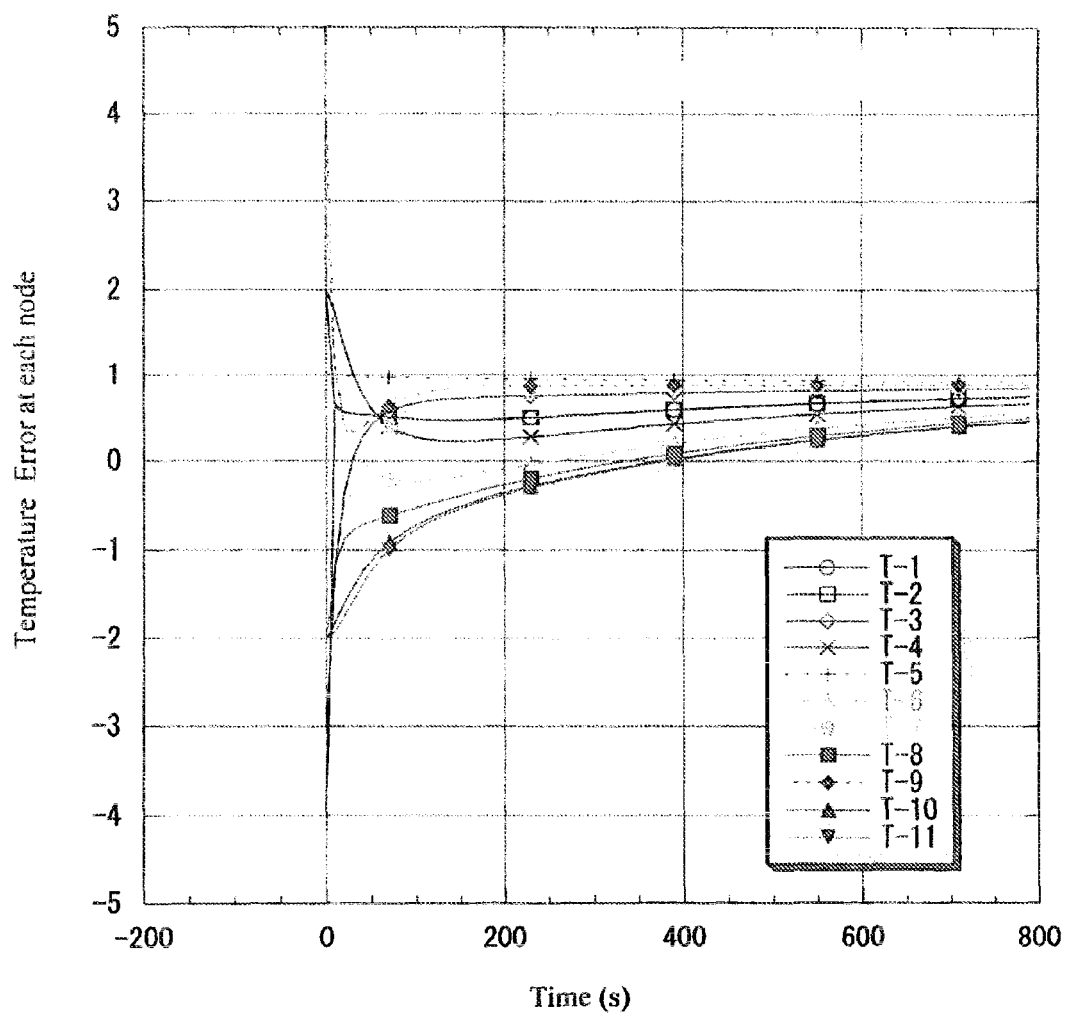
FIG. 11 is a graph showing a simulation result of a fixed duty-cycle rate control scheme.

FIG. 11 shows a simulation result of a control scheme based on the new control rule, using the preset duty-cycle indexes (8.3, 12.5, 12.5, 25, 25, 5, 12.5, 12.5, 6.25, 25, 8.3) of the numerical model. In this control scheme, an open loop control is applied to a duty cycle.

As seen in FIG. 11, a temperature is subjected to a convergence control. The temperature is converged to an index slightly greater than a target index, because an aggregate power to be determined by the duty-cycle indexes is 130 W, whereas the target temperature is an equilibrium temperature to be obtained at 125 W. The reason is that even if a certain channel requires a duty-cycle index of greater than 25, the duty-cycle index is forcibly set at 25, as above.

(Numerical Model-2: On/Off Control Plus Target Temperature-Based Control)

Figure 12:
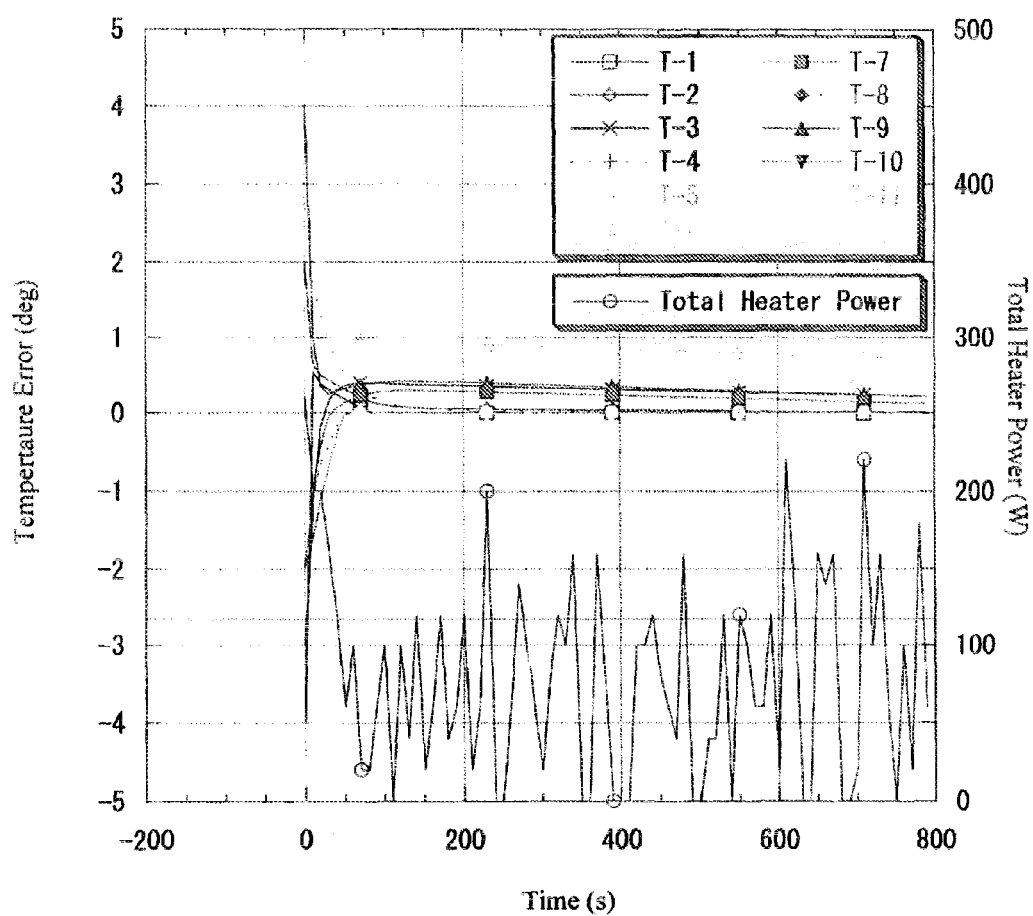
FIG. 12 is a graph showing a simulation result of an on/off control scheme.

FIG. 12 shows a simulation result performed under the condition that a plurality of heater channels (aggregate power consumption: 125 W) in a common control target were on/off-controlled individually. A heater input-power index for each of the channels is set at an index conforming to the equilibrium condition: (15, 10, 10, 0, 5, 25, 10, 10, 20, 5, 15) (W). As seen in FIG. 12, an instantaneous power peak of 230 to 250 W appeared, and a large change in heater power consumption undesirably occurred.

As compared with the fixed duty-cycle control, the controllability on temperature is improved, an error is stably reduced even in a node having a relatively large time-constant.

A problem solved by the control logic as set forth in the present invention is the above change in aggregate heater power consumption.

(Numerical Model-3A: Control Logic in Present Invention; (a) Reset Type)

Figure 13:
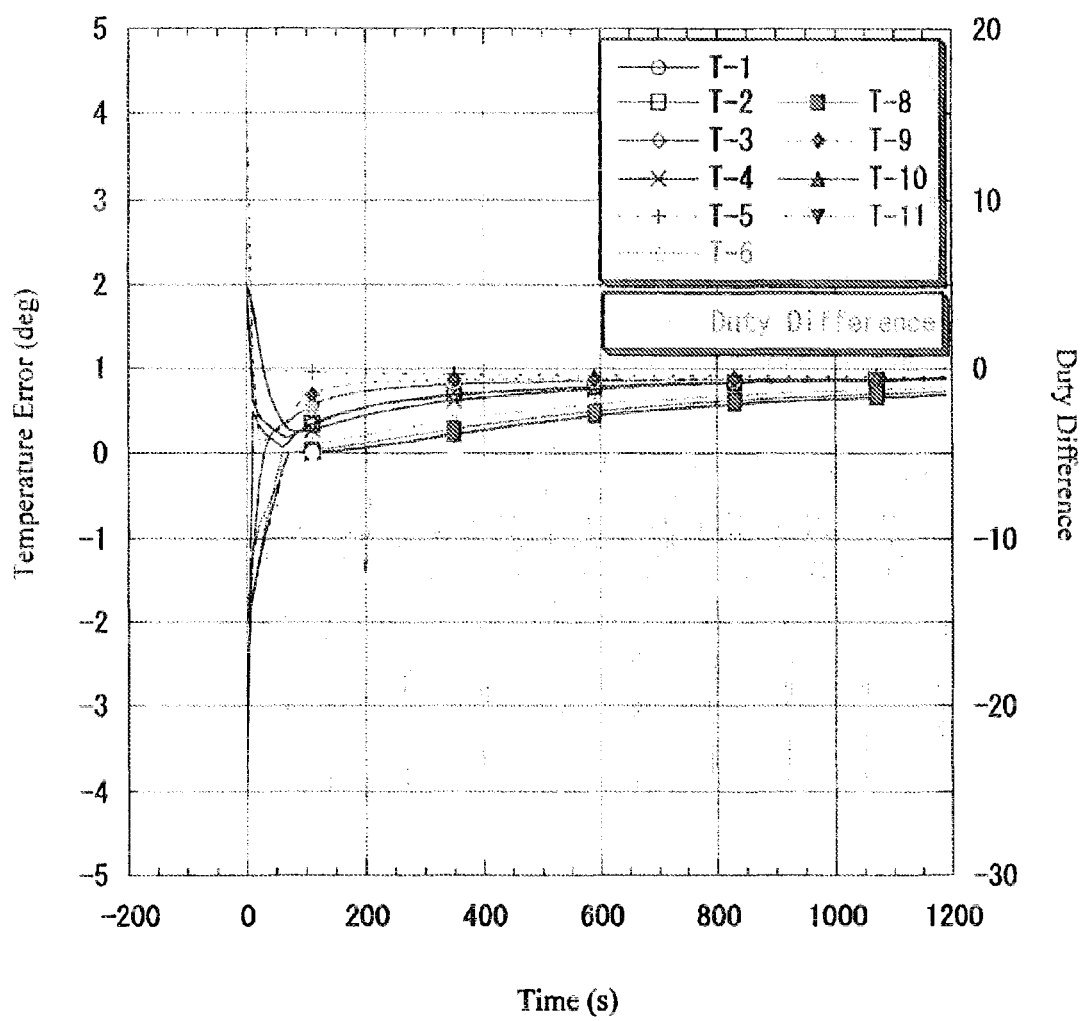
FIG. 13 is a graph showing a simulation result of a (reset-type) distributed control scheme according to the present invention.

In the present invention, the control logic using a combination of two evaluations of a turn-on interval index table and a temperature deviation degree can be implemented in the simplest manner by turning on each node for a predetermined fixed time and then resetting a counter of a Coast Card. FIG. 13 shows a simulation result of the control scheme using this logic. As seen in FIG. 13, a temperature is adequately controlled as expected, and a convergence performance is superior to that in the fixed duty-cycle rate control. A difference with a turn-on interval index, as illustrated in FIG. 13, i.e., a difference between a predetermined interval, and a Coast Card counter number just before a turn-on request is issued, is less than –5, which suggests a sound condition where the control is performed while giving the highest priority to the temperature control.

In FIG. 13, the temperature is controlled to be generally a relatively high index due to the aggregate power set at 130 W.

(Numerical Model-3B: Control Logic in Present Invention; (B) Adaptive-Type Duty-Cycle Update Scheme)

Figure 14:
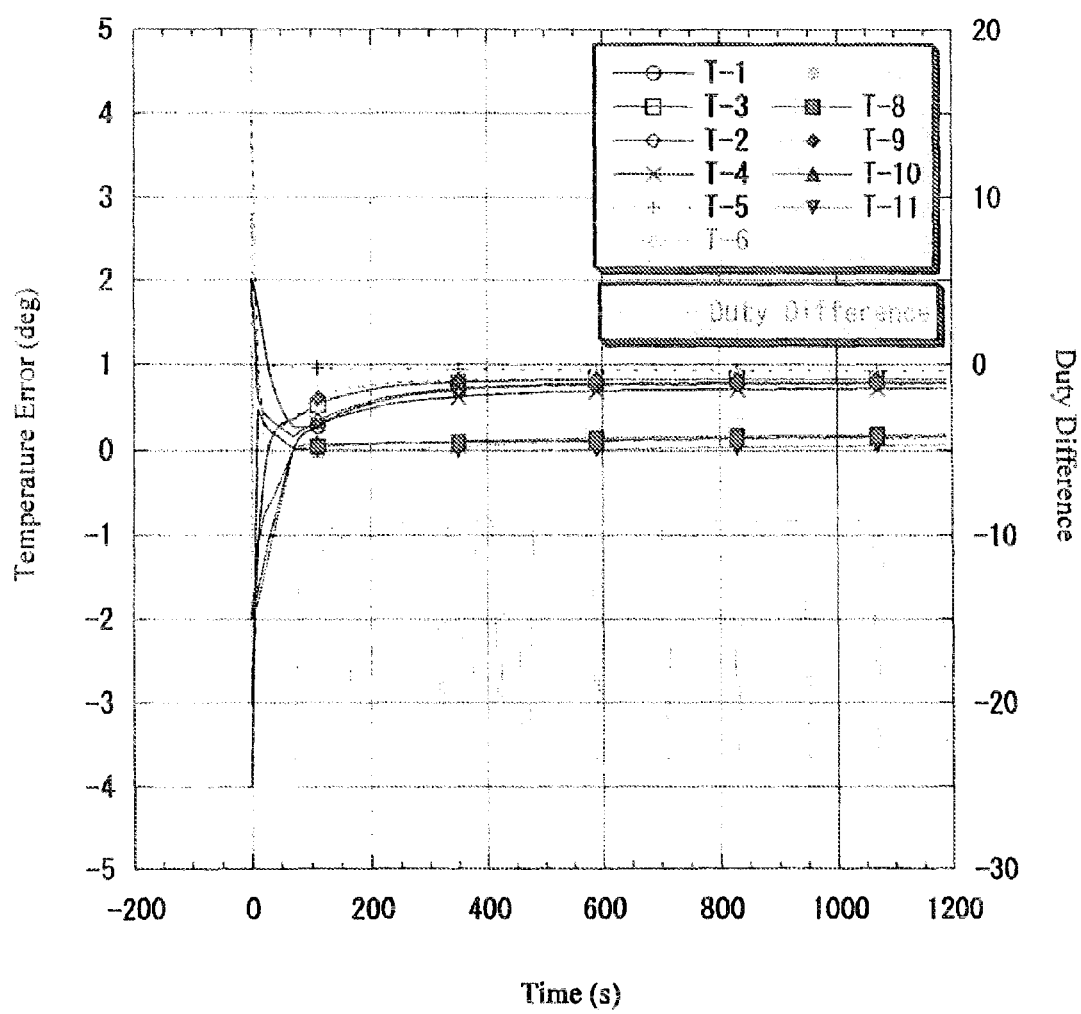
FIG. 14 is a graph showing a simulation result of a (adaptive-type) distributed control scheme according to the present invention.

FIG. 14 shows a simulation result of an adaptive-type control scheme configured to update a turn-on interval index table every time any one of entitles issuing On Cards starts committing as a server. In this control scheme, an initial index of the turn-on interval index in each node is set at 25 cycles, i.e., an index for allowing the node to be turned on for 40 msec per second. An adaptation will be completed within 500 seconds after initiation of the control, and a difference in interval at a time when a Coast Card is subsequently issued is converged as a steady repetitive pattern. A finally well-adapted turn-on interval index in each node was set as follows: (8.4, 12.5, 12.5, 25, 25, 6.3, 12.5, 12.5, 6.3, 25, 8.3). These indexes are close to the fixed duty-cycles employed in the numerical model-1. A slight difference between the respective turn-on interval indexes of the numerical models-1 and 3B corresponds to the fact that respective final temperatures are converged to two different indexes. That is, it can be said that the adaptation process corresponds to an operation of sequentially solving a fourth degree equation to obtain a steady solution. In the result of this control scheme, it is understood that an aggregate power is automatically converged to 125 W as a power constraint.

(Numerical Model-3C: Control Logic in Present Invention; (C) Aggregate Heater Input Power-Designated Adaptive-Type Duty-Cycle Update Scheme)

Figure 15:
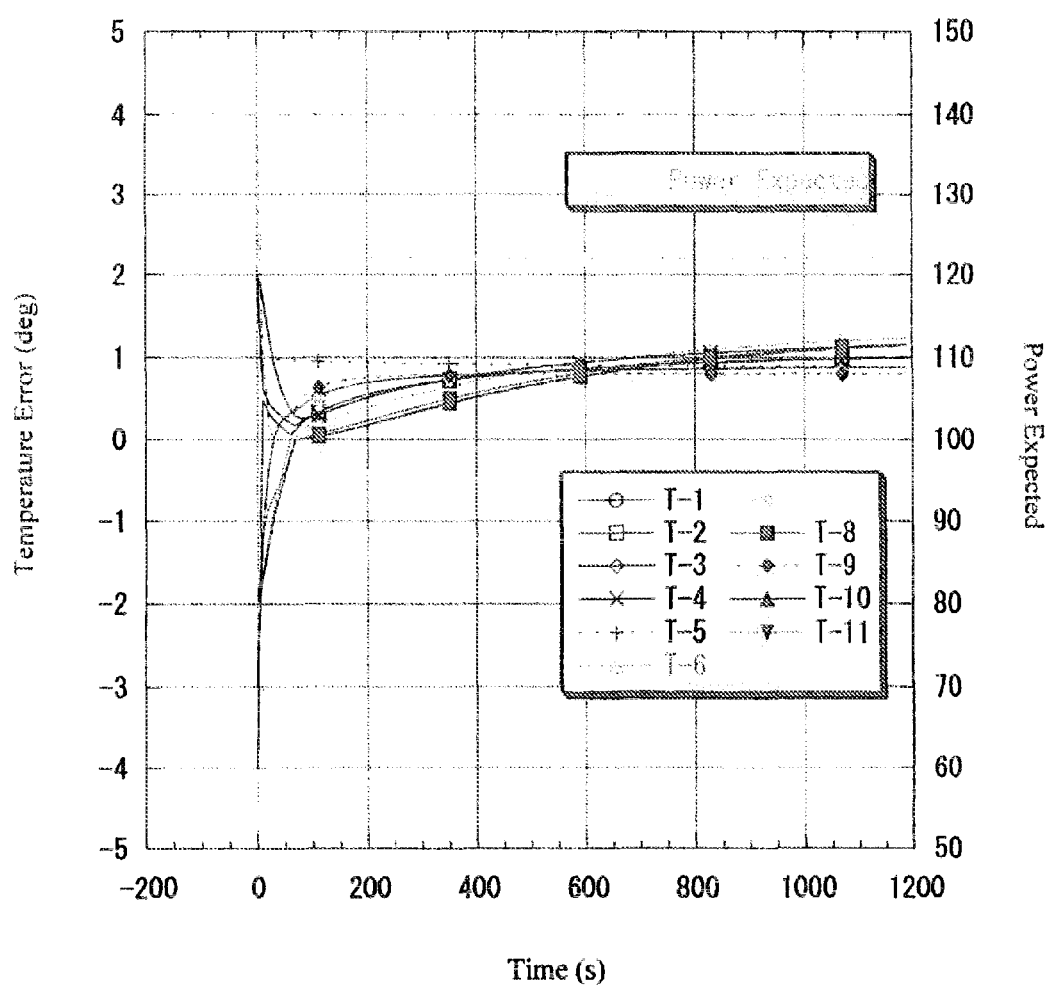
FIG. 15 a graph showing a simulation result of a distributed control scheme according to the present invention, wherein 122 W is designated as an aggregate power.

As a result of substantial completion of the adaptation process, an aggregate power index is stabilized. If the actual aggregate power index is different from a desired aggregate power index, an adaptive control can be further executed to allow the actual index to conform to the desired index. FIG. 15 shows a simulation result performed by restricting the aggregate power to 122 W. The control was successfully carried out to converge the turn-on interval index in each node as follows: (8.2, 16.6, 16.6, 25, 25, 4.0, 16.6, 16.6, 8.2, 25, 8.2). FIG. 15 additionally shows the aggregate power index determined as the result of the adaptive control.

While the result of the control scheme 3C might be superficially read as if the temperature is converged to an index greater than a target temperature with less power, a temperature hysteresis with an extremely large time constant exists, and the temperature will be converged to a relatively low index after an elapse of infinite time. As seen in the result of the control scheme 3C, 122 W can be designated as the aggregate power.

By contract, in another simulation where the same control was performed while restricting the aggregate power to 115

W, it was proven that a final temperature is deviated from a target temperature although the controllability is not significantly deteriorated.

This result is natural, because it is intrinsically impossible to achieve a desired temperature control by 115 W. It is not that this control logic can accomplish an impossible control.

The present invention can be expected to be applied to an extremely wide technical field, such as general power controls, data processing systems, and mobile communications as well as space technologies.

Figure 5:
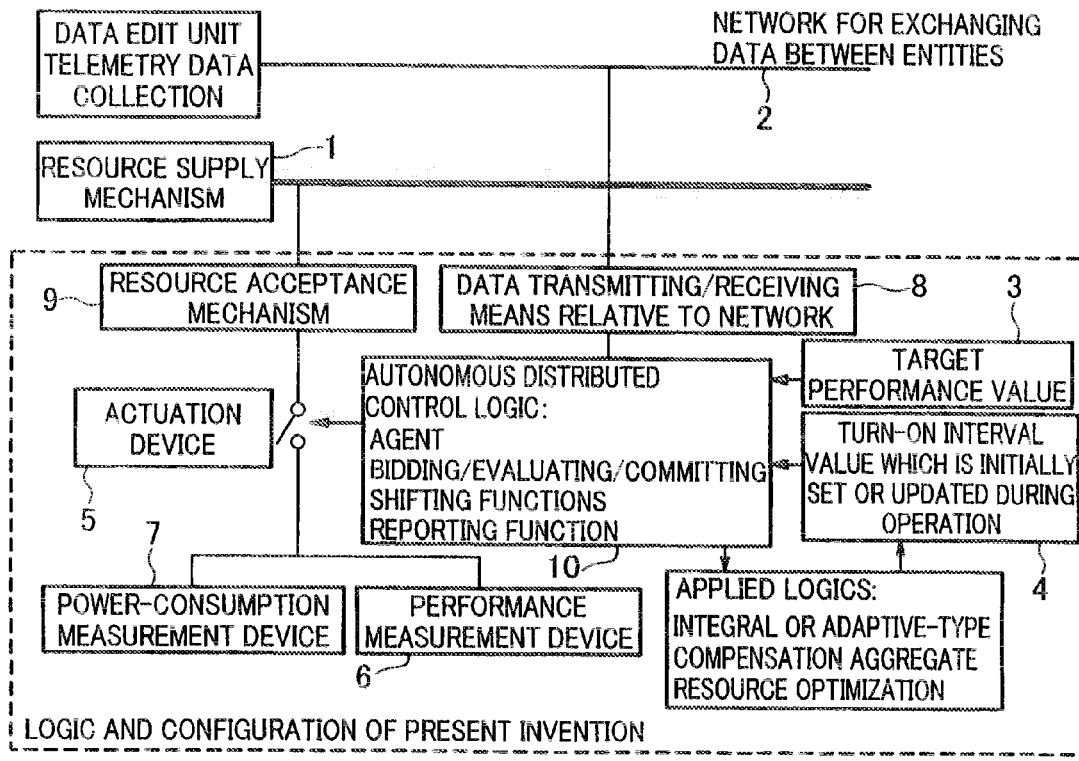
FIG. 5 is a block diagram showing an autonomous distributed control scheme according to the present invention, which is configured to cooperatively maintain an aggregated resource constraint and simultaneously satisfy a predetermined performance in each of a plurality of entities.
Figure 6:
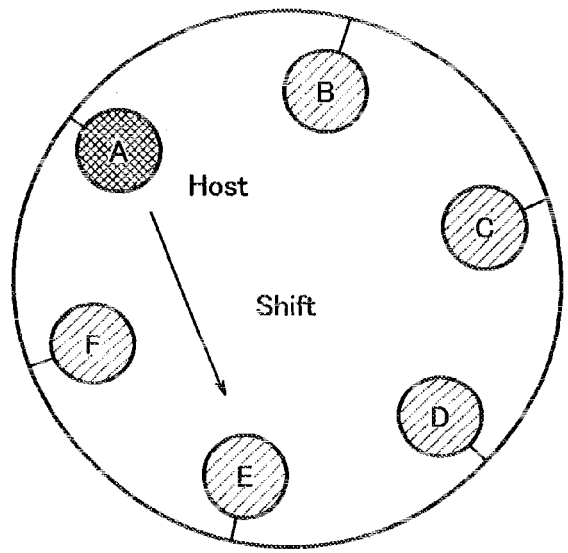
FIG. 6 is a schematic diagram for explaining a delegation of an authority of a server based on a "card game scheme" according to the present invention.
Figure 7:
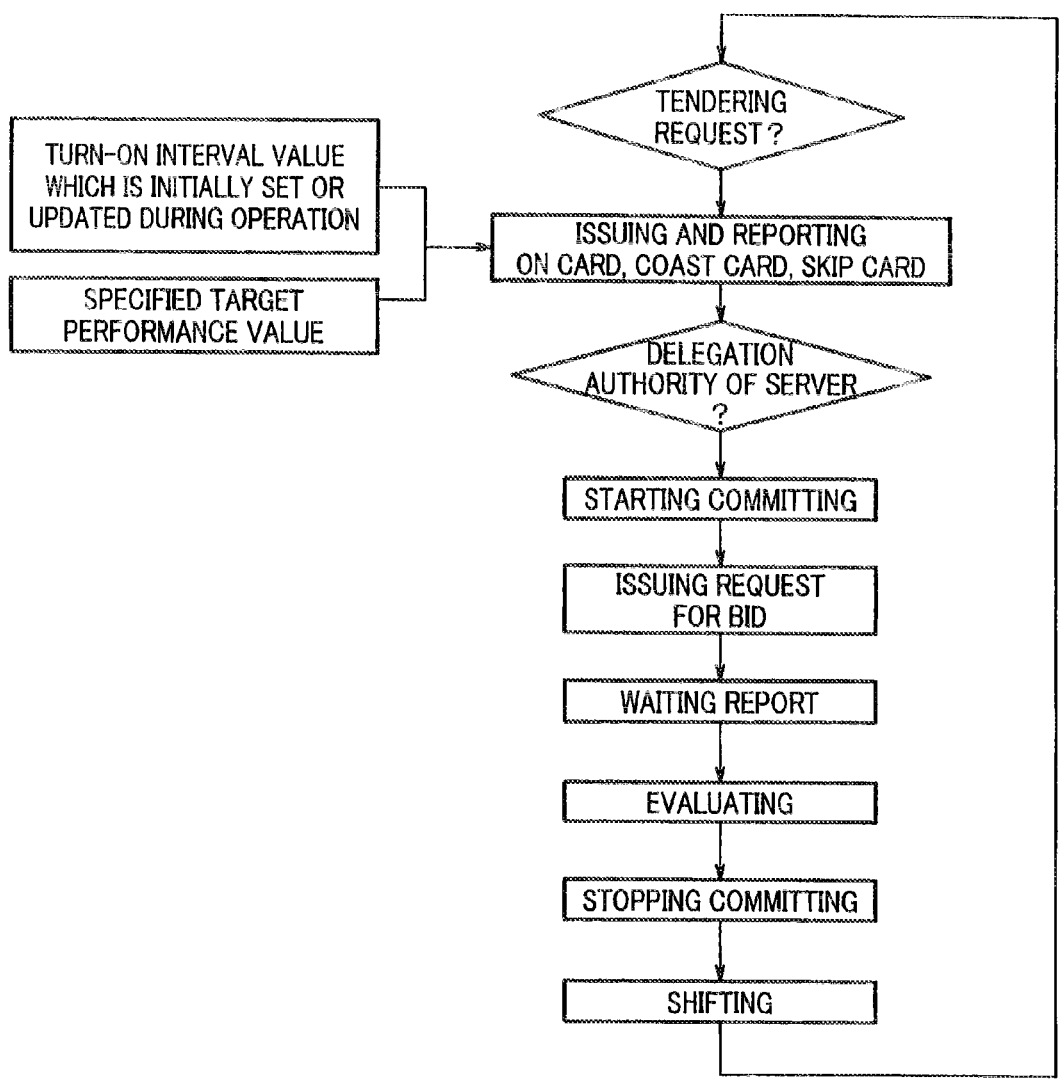
FIG. 7 is a flowchart showing a processing in each of the entities.
Figure 8:
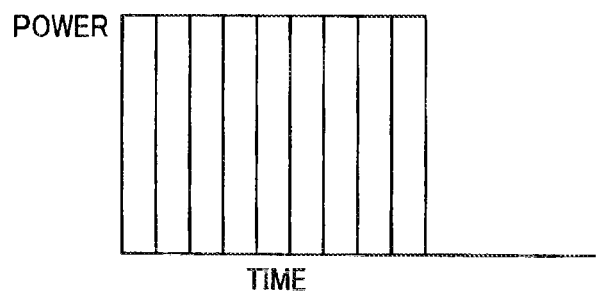
FIG. 8 is a graph for explaining a concept of normalizing a power consumption index of each component to provide a generality thereto.

With reference to FIG. 5, a device and logic according to the present invention to be provided to a system and each entity thereof will be described below.

A control system according to the present invention is designed to satisfy a constraint on an aggregate resource to be input into the entire system and simultaneously achieve or maintain respective specific performances of a plurality of entities of the system. Typically, the control system comprises: a mechanism 1 for supplying a certain amount of constraint resource required for the entire system; and a network 2 adapted to connect between respective ones of the entities so as to allow data about resource consumption and performance in each of the entities to be exchanged therebetween. Each of the entities is adapted to be assigned with a target index 3 with which the specific performance is to be bought into conformity within a predetermined allowable range of the target index, and an initial interval reference index 4 during which the resource is input thereinto. Each of the entities comprises: means for carrying out a function of committing a control operation of effecting the specific performance, or an actuation device 5, which is adapted to consume the input resource in a known amount; a function 5 of measuring the specific performance, or means for carrying out a function 7 of measuring a resource consumption index therein; means for carrying out a transmitting/receiving function 8 of transmitting and receiving data to/from the network; means for carrying out a resource acceptance function 9 of accepting the input resource; and means for carrying out a software function (agent) 10 of autonomously determining a strategy. Further, the entities are designed to take turns to commit the control.

Figure 16:
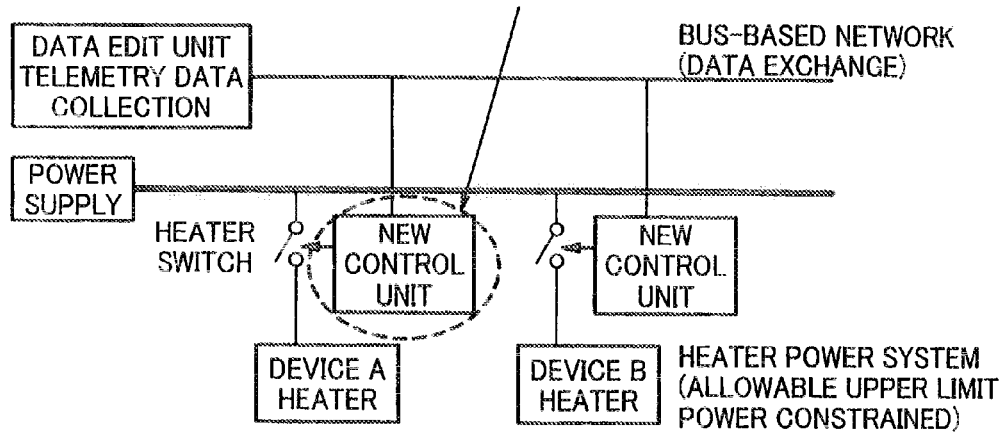
FIG. 16 is a block diagram showing one example of a control scheme according to the present invention, which is configured to maintain an aggregated power consumption constraint and simultaneously satisfy a predetermined temperature.
Figure 17:
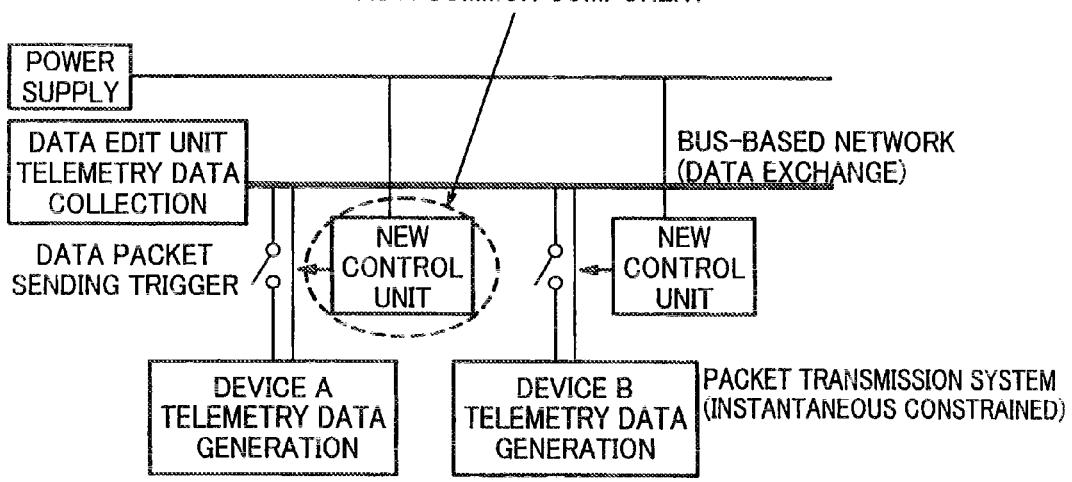
FIG. 17 is a block diagram showing one example of a control scheme according to the present invention, which is configured to maintain an aggregated data traffic constant and simultaneously satisfy a predetermined buffer rate.

For example, a pressing application of the above control system includes a thermal control apparatus for satellites (see FIG. 16) and a data processing apparatus for satellites (see FIG. 17).

In the satellite thermal control apparatus (FIG. 16), the resource is an electric power to be consumed by a satellite system, and the performance is a temperature in each of the entities.

In the satellite data processing apparatus (FIG. 17), the resource is a data traffic processable by a satellite system, and the performance is a residual rate of data in a waiting state on a buffer.

In the applications to satellites, the present invention is expected to be utilized in 1) heater power system, 2) real-time or accumulation-type telemetry data processing, 3) command data processing, 4) power control for devices, and 5) communication between satellites.

In the applications to non-space development fields, the present invention is expected to be utilized in 1) power control for railcars and vehicles, 2) vehicular traffic control, 3) general power management control, and 4) data traffic control for portable phones or the like.

The aforementioned system was actually applied to a simulated satellite system, and fabricated by way of trial. The result of a verification test thereof will be described below.

EXAMPLE

With a view to actually converting the aforementioned functions into hardware so as to verify advantages thereof, eight circuits each incorporating the heater power consuming function, the data collecting function and the agent function of an entity were prepared, and a verification test for operation and performance thereof was carried out.

Figure 18:
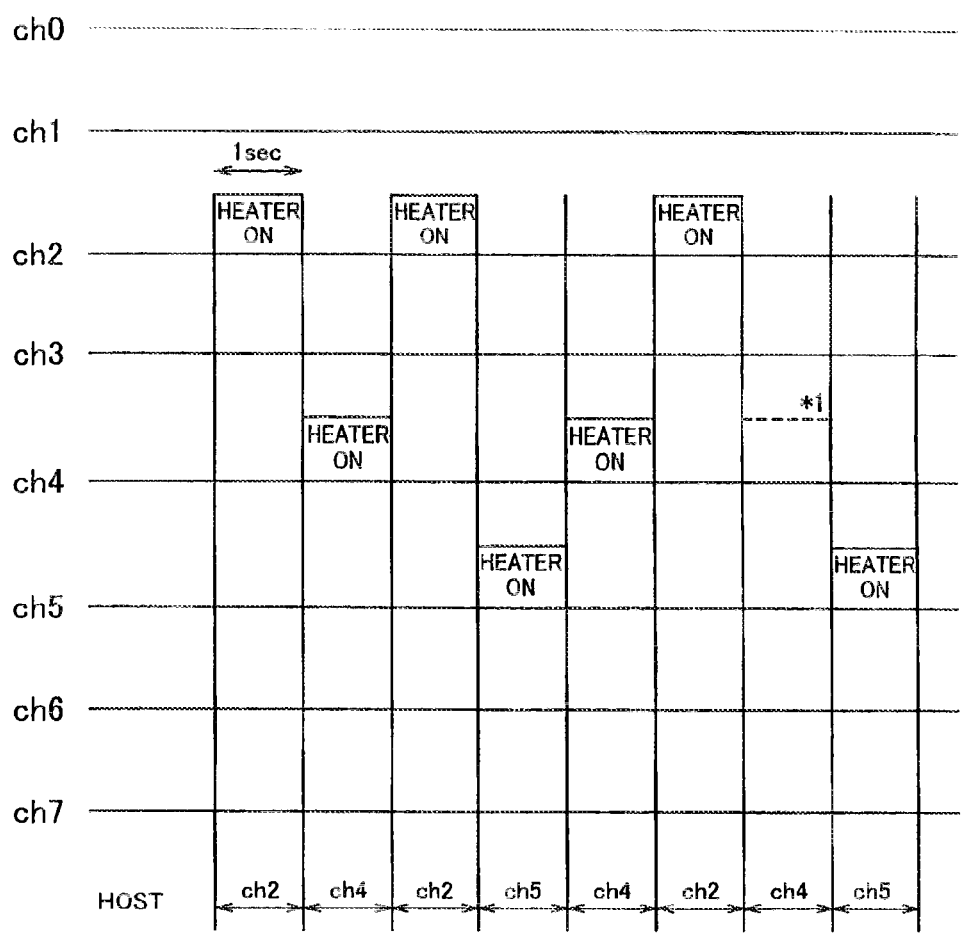
FIG. 18 is a chart for explaining a shifting/delegating function of an authority of a server in a prototype apparatus incorporating the present invention.

FIG. 18 shows a process of carrying out a server function, i.e., consuming a power (committing), and then determining one of a plurality of entities which serves as a next server (bidding, evaluating and shifting). As seen in FIG. 18, the entities take turns to carry out the functions.

Figure 19:
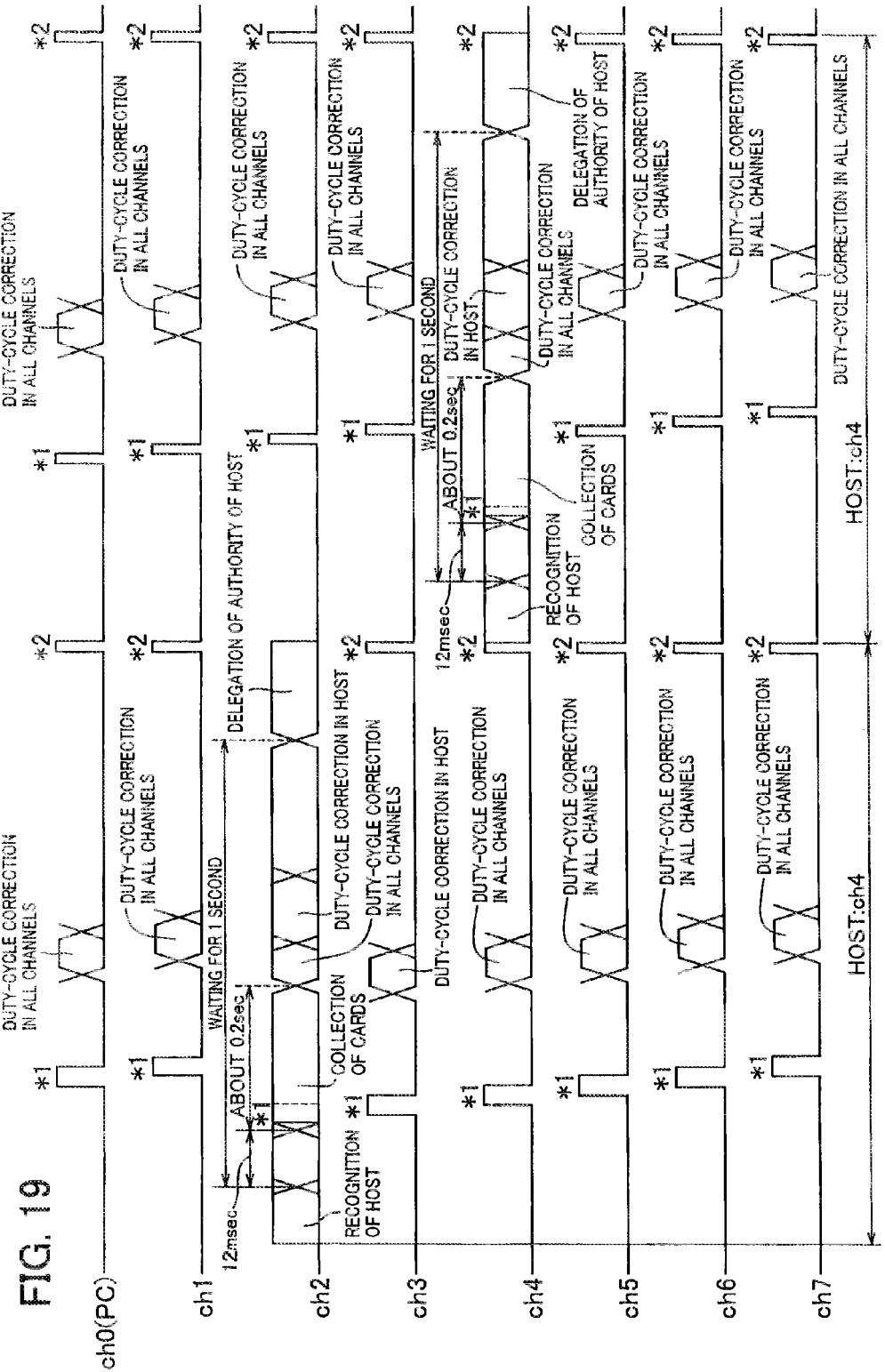
FIG. 19 is a chart for explaining respective timings of data-collection to delegation in the prototype apparatus incorporating the present invention.

FIG. 19 shows respective timings of data collection, bid, evaluation and delegation of an authority of a server, in each of the entities.

Figure 20:
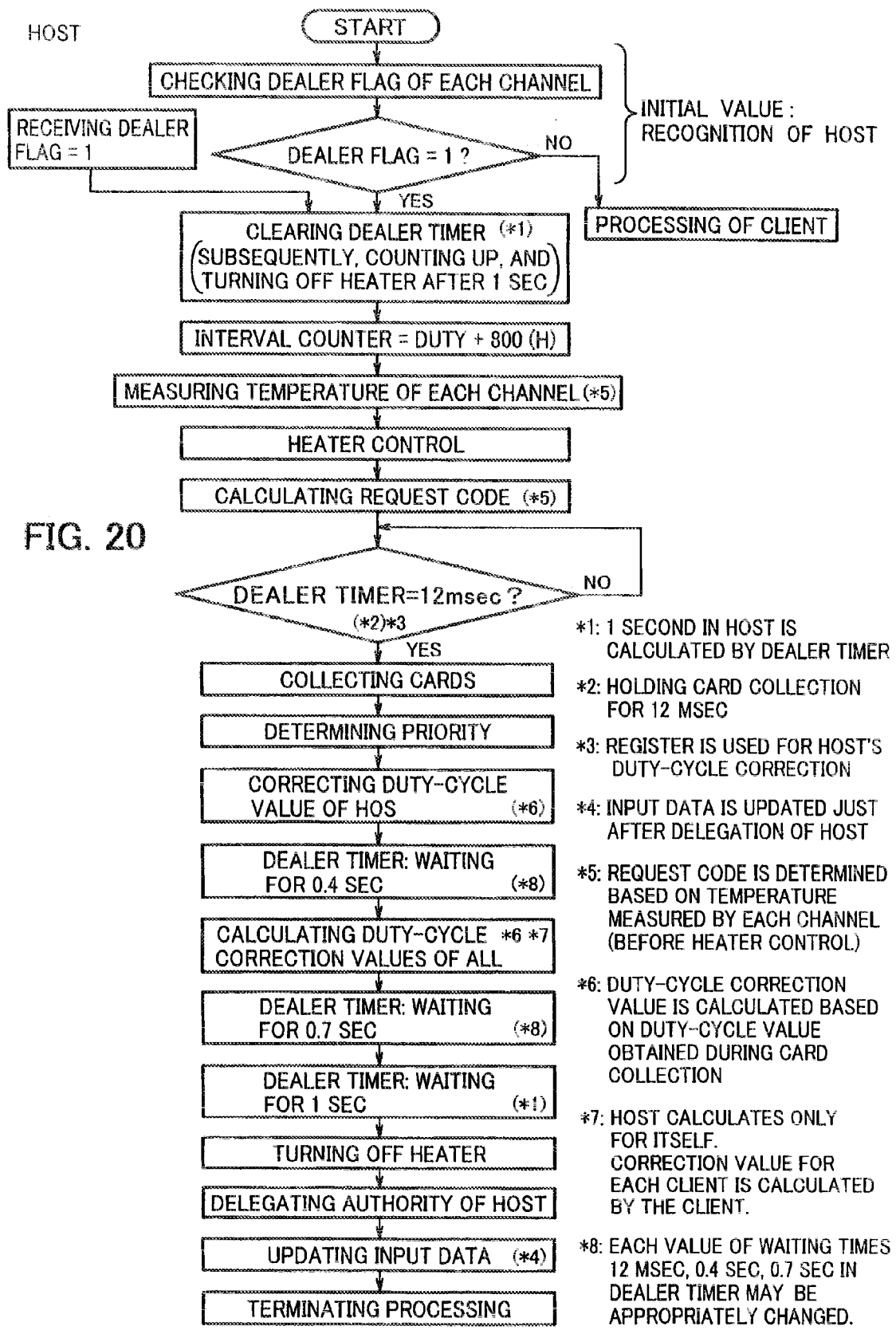
FIG. 20 is a flowchart showing a processing in an agent of each entity in the prototype apparatus incorporating the present invention.

FIG. 20 is a flowchart showing the agent function in each of the entities. When the authority of a server is delegated to one of the entities, the agent of the entity performs an operating of: turning on a heater power supply to consume a power; transmitting a tendering request to each of the remaining entities to collect data; determining, based on reported Card data, one of the remaining entities which serves as a next server, i.e., has the highest need to consume a power; turning off the heater; and delegating the authority of the server.

Figure 21:
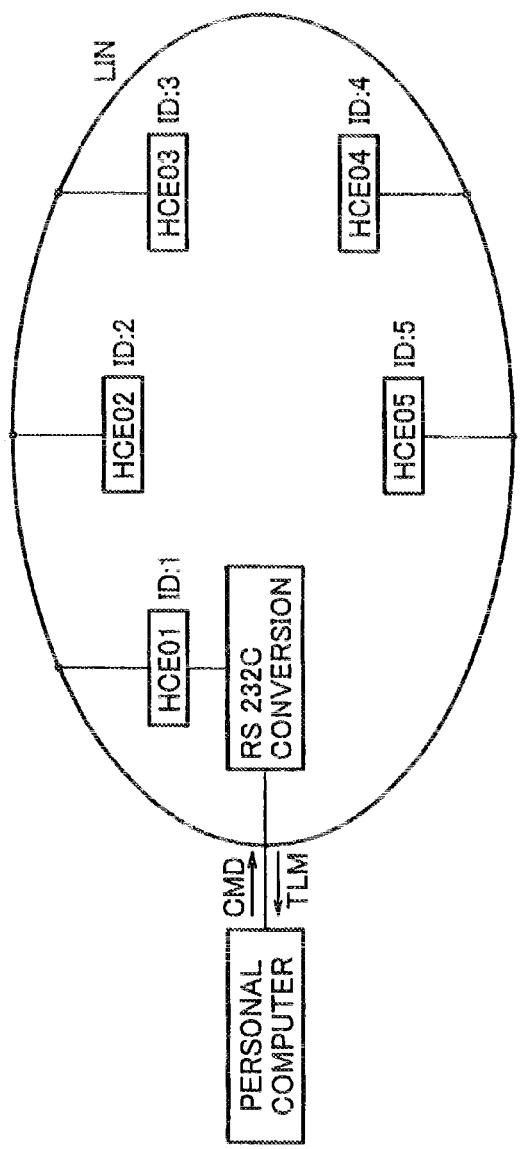
FIG. 21 is a block diagram showing a network connecting between respective ones of the entities (agents) in the prototype apparatus incorporating the present invention.

FIG. 21 shows one example of a configuration for connecting between a network conforming to the LIN Standard, and each entity having an interface thereto/each module (in this example, personal computer) for issuing instructions to a control system of the entity.

Figure 22:
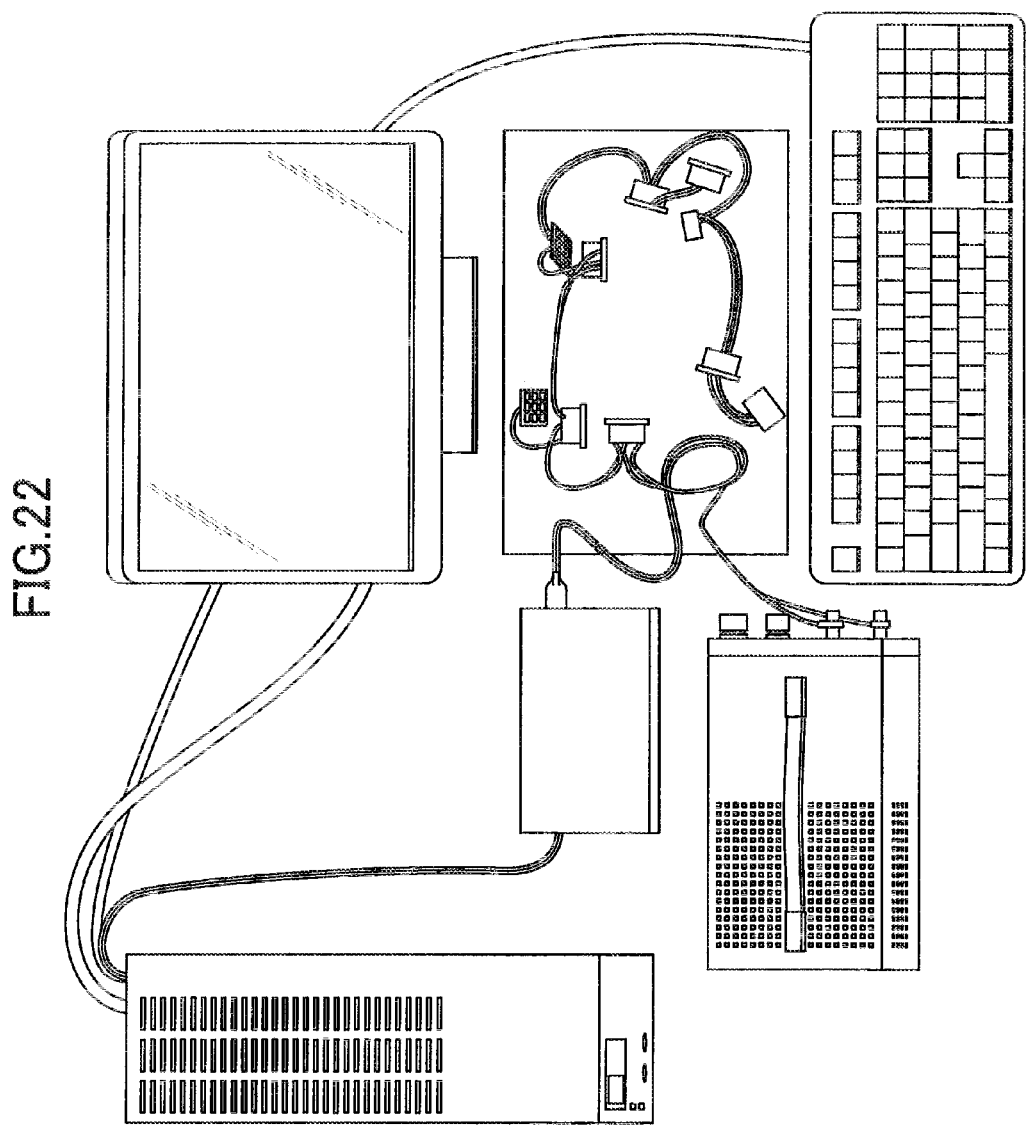
FIG. 22 is a photograph showing a test apparatus used for a functional test on a prototype apparatus according to the present invention.
Figure 23:
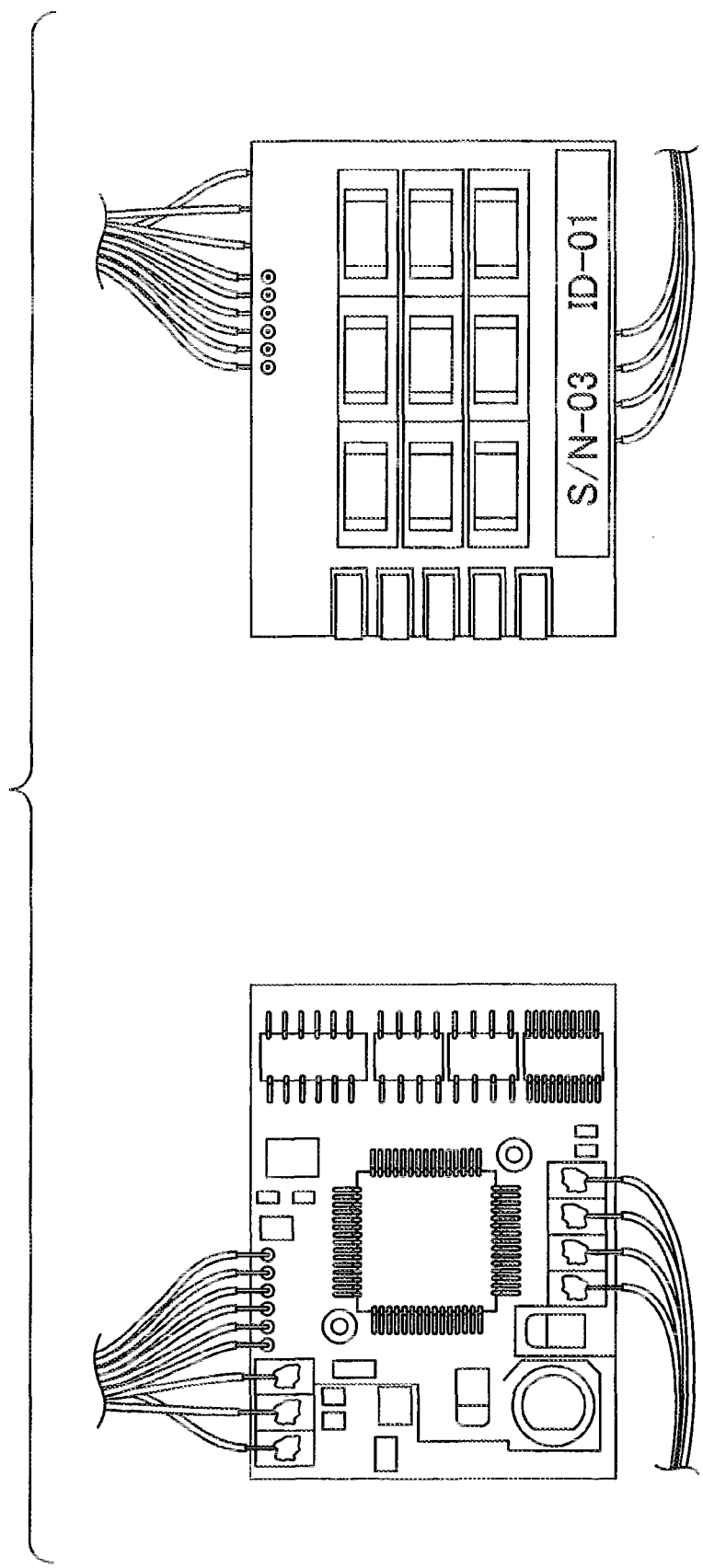
FIG. 23 is a photograph showing devices incorporating the present invention, which have been used for functional evaluation.

FIGS. 22 and 23 show a simple test system used for the evaluation on functions, and a sample hardware board which has the agent function and incorporated a power/data interface.

Figure 24:
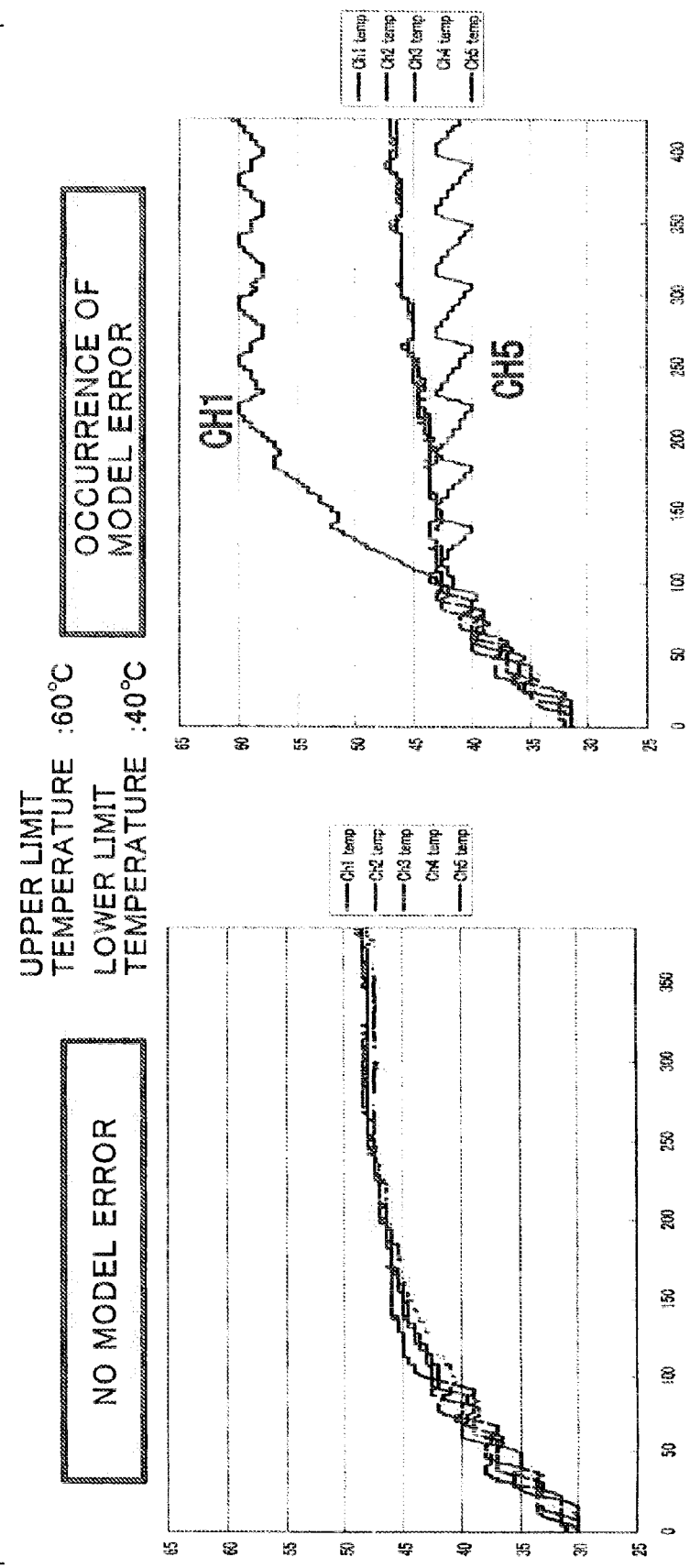
FIG. 24 is a graph showing a simulation test result of a prototype apparatus incorporating the present invention (fixed duty-cycle rate control scheme).

FIG. 24 shows one example of a simulation test on the simplest fixed duty-cycle control scheme, which was performed under a constraint on an aggregate resource. The left graph of FIG. 24 shows a test result obtained when a numerical thermal model to be subjected to the control has adequate accuracy, and the right graph of FIG. 24 shows a test result obtained when the numerical thermal model includes an error. As seen in the right graph, if the model includes an error, a desired purpose cannot be achieved by the fixed duty-cycle control scheme.

Figure 25:
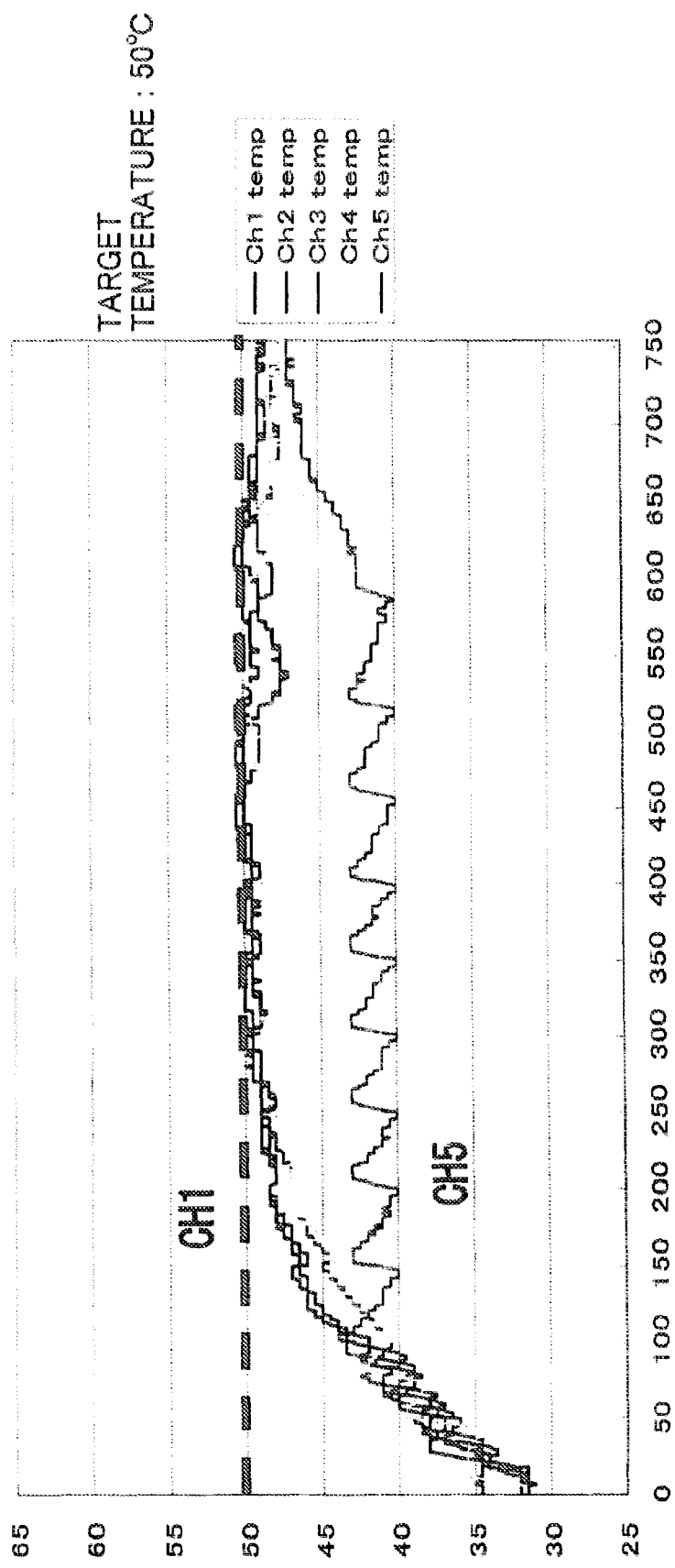
FIG. 25 is a graph showing a simulation test result of a prototype apparatus incorporating the present invention (fixed duty-cycle rate+adaptive-type control scheme).

FIG. 25 shows a simulation result of a control system as one example of an applied scheme of the present invention, which incorporates an adaptive-type agent function capable of adaptively reflecting an actual turn-on interval index to conform to an actual numerical thermal model, wherein the system was designed based on the above numerical thermal model including an error. As seen in FIG. 25, the agent function successfully operated to correct the error of the model so as to satisfy a constraint on an aggregate resource.

Figure 26:
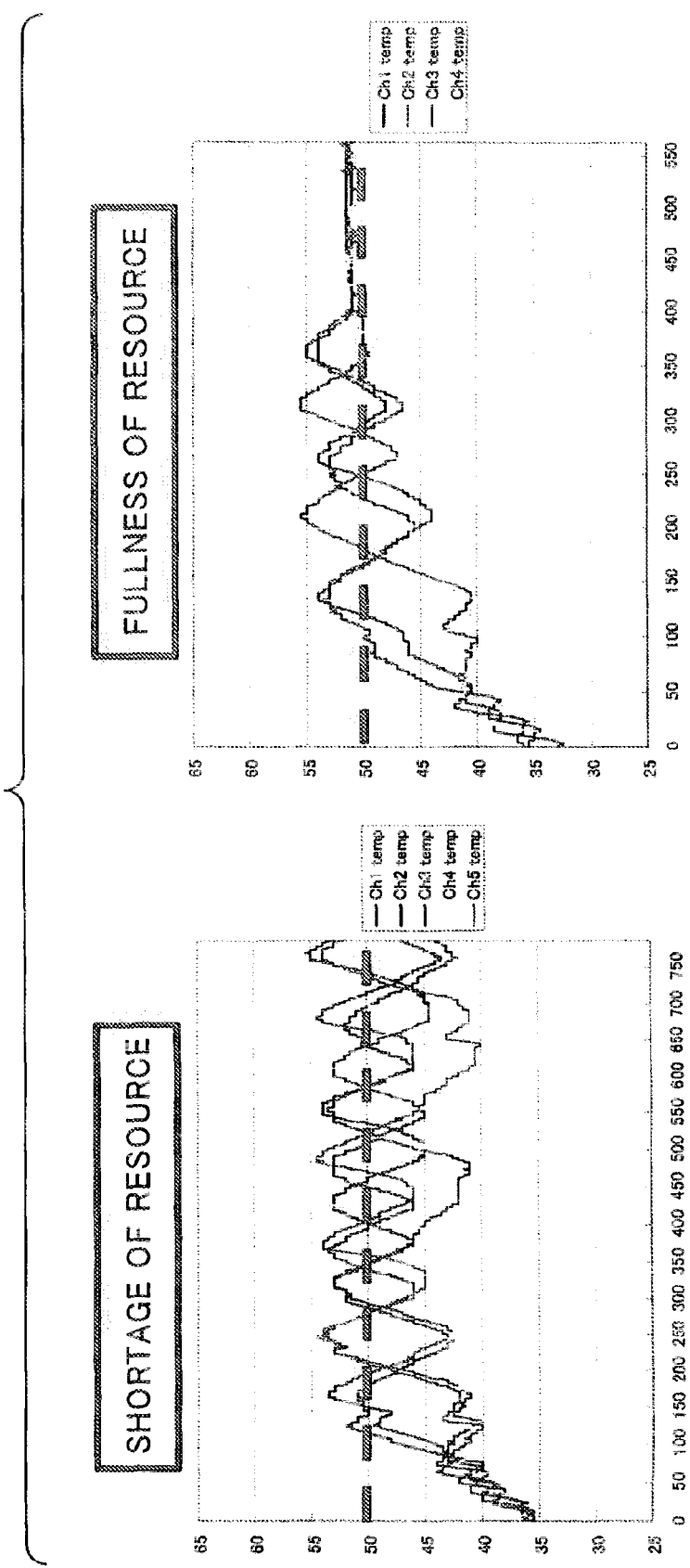
FIG. 26 is a graph showing a simulation test result of a prototype apparatus incorporating the present invention (variable duty-cycle rate: aggregate resource optimization control scheme).

FIG. 26 shows a simulation result of a higher level of control system as another example of an applied scheme of the present invention, which incorporates a function of optimizing an aggregate power and minimizing a resource. The left graph of FIG. 26 shows a simulation result obtained when an aggregate power index theoretically insufficient to achieve an intended purpose is intentionally designated as a target index, and the right graph of FIG. 26 shows a simulation result obtained when a slightly excessive aggregate power index is designated as the target index. As seen in the right graph of FIG. 26, it was numerically proven that the control function can fully operate under the condition of the slightly excessive aggregate power index, and distributedly and sequentially provide practical solutions as long as a constraint aggregate power is theoretically sufficient to achieve an intended purpose. In the right graph of FIG. 26, although an equilibrium state cannot be theoretically achieved at a target temperature, the simulation result shows that the system operates in a time-division manner as a whole under a situation where one component of the system can satisfy a required performance and another component cannot satisfy a required performance.

An advantageous embodiment of the invention has been shown and described. It is obvious to those skilled in the arts that various changes and modifications may be made therein without departing from the nominal concept and the scope thereof as set forth in appended claims.

What is claimed:

1. A method for use in a system including: a plurality of entities (agents) each adapted to exhibit a specific performance while consuming a resource; a mechanism adapted to supply the resource to each of said entities; a mechanism provided in each of said entities to accept the resource; and means provided in each of said entities to carry out a committing function of effecting said specific performance, or an actuation device provided in each of said entities to effect said specific performance, said method being designed to satisfy a constraint on an aggregated resource to be input from said resource supply mechanism into the entire system, and simultaneously control the respective specific performances of said entities, said method comprising:

providing a network adapted to connect between respective ones of said entities so as to allow data about the resource consumption and the specific performance in each of said entities to be exchanged therebetween, and communication means having a function of transmitting and receiving said data;

assigning to each of said entities a target index with which said specific performance is to be brought into conformity within an allowable range around said target index;

assigning to each of said entities an interval reference index during which the resource is input into said entity;

providing means for carrying out a function of measuring the specific performance or the resource consumption in each of said entities;

providing to each of said entities means for carrying out a software function of autonomously and cooperatively determining a strategy;

allowing said entities to take turns to perform said software function, wherein said software function includes, when each of said entities is assigned with an initial index of said interval reference index, and dynamically shifted between two roles of a server and a client, dynamically performing four actions of said server consisting of bidding, evaluating, committing and shifting, or an action of said client consisting of reporting, so as to allow said entities to distributedly perform a processing of determining a strategy for the entire system; and wherein the software function in any selected one of said entities to whom said role of said server is delegated according to said shifting action, further comprises:

performing said committing the resource consumption in said selected entity to bring said specific performance into conformity to said target index or maintain said specific performance at said target index;

performing said bidding action to collect first data about a difference index between an actual specific performance and said target index in each of the remaining entities and second data about a difference index between said assigned interval reference index allowing the resource to be consumed at a predetermined index, and an actual number of time-frames in an elapsed time period after the latest turn-on instance in each of said remaining entities;

performing said evaluating action to select one of said remaining entities which is to be allowed to commit the resource consumption in a subsequent time-frame; and performing said shifting action to delegate an authority to determine said strategy.

2. The method as defined in claim 1, wherein the software function in each of the remaining entities other than said server includes, in response to a tendering request from said server, reporting a status of the specific performance and the resource input in said entity.

3. The method as defined in claim 1, wherein the software function in each of the remaining entities other than said server includes, in response to a tendering request from said server, reporting first data about a difference index between an actual specific performance and said target index in each of the remaining entities, and second data about a difference index between said assigned reference interval index allowing the resource to be consumed at a predetermined index, and an actual number of time-frames in an elapsed time period after the latest turn-on instance in each of said remaining entities, in the form of three types of Cards comprising:

an On Card which is issued when said actual specific performance is below a lower limit of said allowable range;

a Coast Card which is issued when said actual specific performance falls within said allowable range, said Coast Card being indicative of a difference index between said assigned interval reference index and an actual time-frame number in an elapsed time period after a latest turn-on; and a Skip Card which is issued when said actual specific performance is above an upper limit index of said allowable range, said Skip Card being indicative of no need for positively consuming the resource.

4. The method as defined in claim 3, wherein said software function in said server includes, during said evaluating action based on said collected first and second data which contains one or more On Cards, selecting, as a next server, one of the remaining entities which has issued the On Card having a largest difference index, and, during said evaluating action based on said collected first and second data which contains no On Cards and one or more Coast Card, selecting, as a next server, one of the remaining entities which has issued the Coast Card having the largest difference index.

5. The method as defined in claim 3, wherein said software function in each of the remaining entities other than said server includes avoiding issuing the Skip Card on a case-by-case basis.

6. The method as defined in claim 3, wherein said software function in said server includes, during said committing action, clearing an index of said Coast Card in each of said remaining entities to zero, and subsequently continuing said committing action with reference to said initially assigned interval reference index.

7. The method as defined in claim 3, wherein said software function in said server includes, during said committing action, clearing an index of said Coast Card in each of said remaining entities to zero, and then adaptively controlling each of said remaining entities based on an actual performance thereof after an operation of adjusting and updating said interval reference index with reference to said pre-cleared index of said Coast Card.

8. The method as defined in claim 1, which includes the steps of normalizing respective resource consumption indexes to be determined for said entities, at a same index.

9. The method as defined in claim 1, wherein:
said system is a heating system and/or a cooling system;
said resource is electric power; and
said specific performance in each of said entities is temperature.

10. The method as defined in claim 1, wherein:
said system is a data input-output system;
said resource is a segmented data traffic; and
said specific performance in each of said entities is a utilization efficiency of a buffer device.

11. The method as defined in claim 1, wherein said network of said system is installed concurrently with and along a line for supplying said resource.

* * * * *